United States Patent [19]
Asakura et al.

[11] Patent Number: 4,862,207
[45] Date of Patent: Aug. 29, 1989

[54] DIAPHRAGM APPARATUS FOR CAMERA

[75] Inventors: Yasuo Asakura; Toshiyuki Toyofuku, both of Hachioji, Japan

[73] Assignee: Olympus Optical Company Limited, Japan

[21] Appl. No.: 193,045

[22] Filed: May 18, 1988

[30] Foreign Application Priority Data

May 21, 1987 [JP] Japan .................................. 62-124614
Jun. 24, 1987 [JP] Japan .................................. 62-158552

[51] Int. Cl.$^4$ .............................................. G03B 9/02
[52] U.S. Cl. .................................... 354/453; 354/457; 354/271.1
[58] Field of Search ...................... 354/453, 457, 271.1

[56] References Cited
U.S. PATENT DOCUMENTS 4,609,275 9/1986 Ishiguro ............................. 354/453

FOREIGN PATENT DOCUMENTS 0099133 8/1975 Japan .
0051937 4/1977 Japan .
0102835 8/1981 Japan .

Primary Examiner—Russell E. Adams
Attorney, Agent, or Firm—Louis Weinstein

[57] ABSTRACT

A diaphragm apparatus is disclosed including a piezoelectric actuator of bimorph type. A drive circuit associated with the actuator applies a voltage corresponding to a diaphragm aperture which is calculated in accordance with a photometric value to the actuator to produce a displacement thereof, which is transmitted through a diaphragm operating member to open or close diaphragm blades so as to control a diaphragm aperture. The drive circuit applies a reset voltage which resets the diaphragm blades to a predetermined reset condition, to the piezoelectric actuator, and after the resetting operation, it applies a voltage corresponding to a given diaphragm aperture to the piezoelectric actuator.

41 Claims, 22 Drawing Sheets

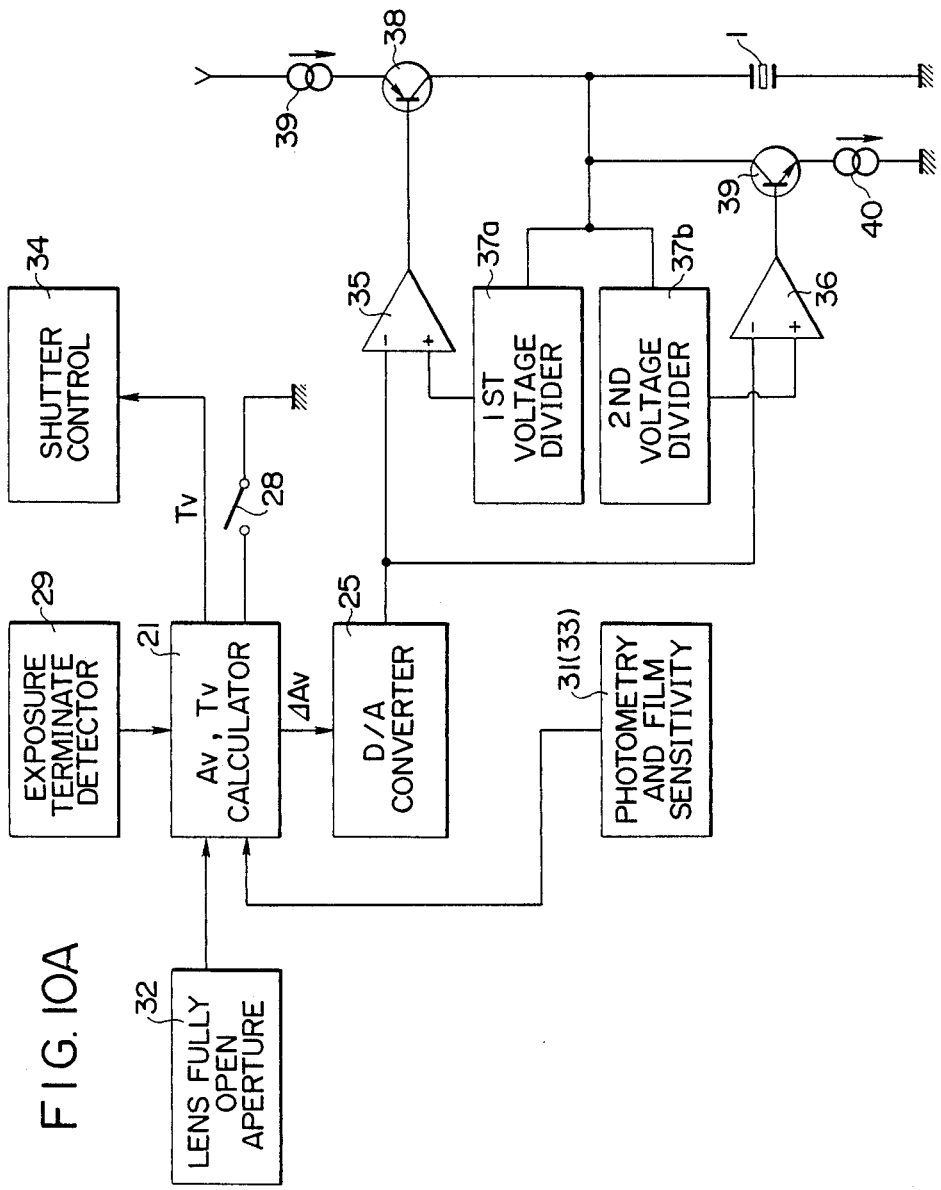
F I G. 10A

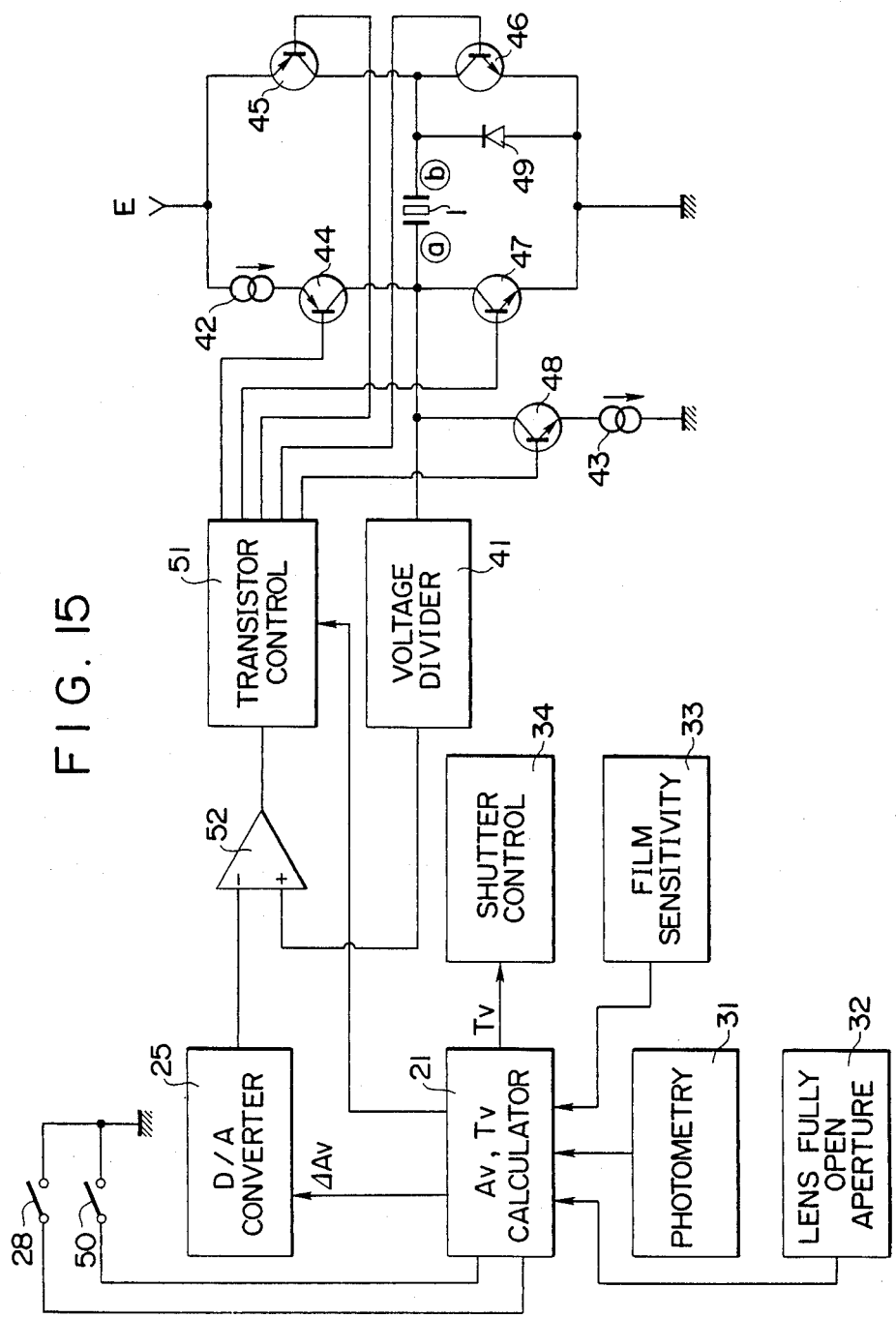

DIAPHRAGM APPARATUS FOR CAMERA

FIELD OF THE INVENTION AND RELATED ART STATEMENT

The invention relates to a diaphragm apparatus for a camera, or more particularly, to such apparatus which effects a photometry of an object being photographed to control a diaphragm in order to establish a proper diaphragm aperture for an intended photographing operation automatically.

One form of diaphragm apparatus used in a still camera for controlling a diaphragm aperture is illustrated in Japanese Laid-Open Patent Application No. 99,133/1985 in which the restoring resilience of a charged spring is utilized to reduce the diaphragm aperture toward its minimum value, and the aperture is continuously detected so that the aperture controlling operation may be interrupted by a stop mechanism which utilizes an electromagnetic unit upon reaching a given diaphragm aperture. When the diaphragm is to be returned to its open condition subsequent to the completion of an exposure of a film, the restoring resilience of the precharged spring is again utilized to release the stop mechanism and to open the diaphragm.

Japanese Laid-Open Patent Application No. 102,835/1981 discloses diaphragm controlling means which effects a servo motor drive while continuously detecting the reducing magnitude of the diaphragm aperture. Also, Japanese Laid-Open Patent Application No. 51,937/1977 discloses diaphragm controlling means which utilizes a stepping motor.

However, a conventional approach which utilizes the restoring resilience of a charged spring requires a charging mechanism, a transmission mechanism and a stop mechanism, resulting in a complicated arrangement and an increased size of a camera. If such approach is employed in a fully automatic camera which is offered on the market recently and in which a spring is charged by a motor, the complexity of the arrangement causes an increased power loss, thus causing an accelerated exhaustion of a storage battery or an increased size thereof. Additionally, means must be provided which continuously detects the prevailing diaphragm aperture and separate calculation means to operate stop means in response to an output from the detecting means, again causing an increased complexity of the electrical circuit.

Where a servo motor drive is used, it is necessary to transmit an output from the motor to a diaphragm controlling mechanism as through gears, requiring an additional space for the provision of the motor or gears to make it difficult to provide a compact camera. Noises produced by the meshing engagement between the gears presents another problem. When it is desired to control the diaphragm aperture to a higher accuracy, it is necessary to decelerate the motor output before it is transmitted to the aperture controlling mechanism since it is difficult to stop the motor all of a sudden, thus presenting difficulty in achieving a high speed diaphragm control. The detection of the diaphragm aperture to feed such information back to the motor rotation requires aperture detecting means and feedback means, which again causes a further complication of the electrical circuit.

On the other hand, where a stepping motor is utilized, the number of steps which are used in controlling the diaphragm aperture must be increased if a high resolution is desired. However, a small size stepping motor which can be used in a camera exhibits a very low level of drive speed per pulse, making it impossible to achieve a diaphragm control at high speed and with a high resolution.

It will be understood that the described disadvantages of the prior art can be overcome by employing a piezoelectric actuator of bimorph type which is well known in itself, the displacement of which may be utilized to control the operation of diaphragm blades to achieve a diaphragm control to a high accuracy level in a compact manner.

However, such piezoelectric actuator is subject to a hysteresis, as will be dealt with below, causing its operating response to change with an initial condition where a drive voltage is applied. Specifically, FIG. 23 graphically shows the relationship between the deflection $\delta$ of a piezoelectric actuator and a voltage V applied thereto. An initial condition with no applied voltage is assumed to be located at point O. If the applied voltage is now increased in the positive direction, the behaviour of the actuator follows a curve $l_1$, reaching a point A at an applied voltage $V_1$. If the applied voltage is now decreased, the behaviour follows another curve $l_2$, reaching a point B at zero applied voltage, and if a negative voltage is then applied, the behaviour reaches a point C at an applied voltage $V_2$. Subsequently, when the applied voltage is increased in the positive direction, the behaviour follows a curve $l_3$, reaching a point D at zero applied voltage, and a further increase in the applied voltage causes the point A to be reached at the applied voltage $V_1$. Thus, the relationship between the deflection $\delta$ and the applied voltage V of the piezoelectric actuator exhibits a hysteresis. The residual deflection at zero applied voltage, as shown at point B or D, is also subject to an aging effect.

On the other hand, if a voltage $V_1$ and zero voltage is alternately applied to the actuator which initially assumes the point B, the behaviour of the actuator moves back and forth between the points B and A along curves $l_4$, $l_2$. Accordingly, if the behaviour of the actuator along the curve $l_4$ located between the points B and A are utilized in the diaphragm control, a given relationship can be established between the deflection, corresponding to a diaphragm aperture, and the applied voltage, allowing its application to a diaphragm control. However, when the piezoelectric actuator assuming the condition of the point B, thus without any voltage applied thereto, is left unused over a prolonged period of time, the magnitude of the deflection will be incrementally reduced toward zero from point B if there is a rapid temperature change during such period. Thus, there occurs an aging effect which causes a gradual decrease in a residual deflection which is obtained without applied voltage. Assume that the residual deflection has changed to a value indicated by point B'. When the applied voltage is increased in the positive direction from point B', the behaviour of the actuator follows a curve $l_5$, reaching the point A at applied voltage $V_1$. Subsequently when the applied voltage is decreased, the behaviour changes along the curve $l_2$, reaching point B. Subsequently, the behaviour remains the same as it exhibited before the described time interval.

Accordingly, it will be seen that if a voltage which would correspond to a given deflection when the piezoelectric actuator remained at point B is applied under the condition thereof represented by point B' at the time a diaphragm control is desired, there occurs a control error because of a deviation between the curves l₄ and l₅.

OBJECT AND SUMMARY OF THE INVENTION

It is a first object of the invention to provide a diaphragm apparatus for a camera which eliminates the described disadvantages of a conventional diaphragm apparatus and which enables a proper diaphragm aperture to be obtained automatically by employing a piezoelectric actuator of bimorph type, the displacement of which is amplified to control the operation of diaphragm blades.

It is a second object of the invention to provide a diaphragm apparatus for camera which utilizes a piezoelectric actuator of bimorph type, the displacement of which is amplified to control the operation of diaphragm blades while preventing a degradation in the accuracy of controlling the diaphragm caused by the hysteresis of the actuator in a sophisticated manner.

The invention provides the following features:

(1) A spring charging mechanism, a transmission mechanism and a stop mechanism can be dispensed with, simplifying the mechanical arrangement to allow a reduction in the size of a camera.

(2) A power saving arrangement suffers little from the transmission loss of power, enabling a longer useful life of a storage battery and a reduction in the size.

(3) Rebounding of diaphragm blades is substantially eliminated, enabling a high speed and a high resolution of diaphragm control.

(4) There is no need to detect a diaphragm aperture and to deliver it along a feedback path during a diaphragm control, providing a diaphragm apparatus which is optimally suitable to be implemented as an electrical control, which can also be simplified.

(5) A resetting operation which takes place before each diaphragm control assures a higher accuracy which is free from the influence of a time interval during which the piezoelectric actuator has been left unused or from the influence of a temperature change.

(6) The diaphragm apparatus has an increased durability and produces little noise during its operation.

BRIEF DESCRIPTION OF THE DRAWINGS

FIGS. 10A and 10B are block diagrams of further forms of drive circuits which may be used in the diaphragm apparatus of the embodiment;

FIG. 15 is a block diagram of a drive circuit which is used to operate the diaphragm mechanism shown in FIGS. 14A to 14C;

DETAILED DESCRIPTION OF PREFERRED EMBODIMENTS

Figure 1:
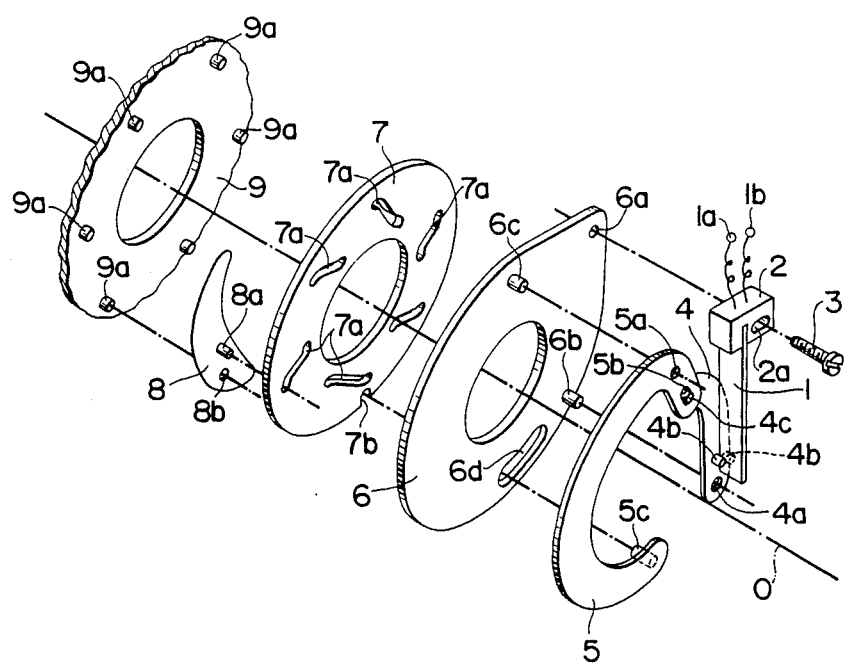
FIG. 1 is an exploded, perspective view of a diaphragm mechanism used in a diaphragm apparatus for a camera according to a first embodiment of the invention.

FIG. 1 is an exploded, perspective view of a diaphragm mechanism used in a diaphragm apparatus for a camera according to a first embodiment of the invention. The diaphragm apparatus includes a diaphragm casing plate 9 as a stationary member, on which a plurality of support pins 9a are fixedly mounted at an equal interval around an optical axis O, and a diaphragm blade 8 has its support opening 8b, formed adjacent to one end thereof, pivotally connected with each support pin 9a (only one blade being shown in the drawings). A diaphragm control plate 7, commonly referred to as an arrow wheel, which is an actual diaphragm operating member is rotatably disposed in alignment with the optical axis O, and is formed with a plurality of cam slots 7a, into which drive pins 8a fixedly mounted on diaphragm blades 8 are fitted.

A piezoelectric actuator 1 of bimorph type, which is well known in itself, has its upper end integrally mounted on a mount 2, which is provided with an elongate slot 2a, allowing it to be secured to a mounting plate 6 by passing a set screw 3 through the slot 2a and threadably engaging it with a threaded hole 6a formed in the mounting plate 6. The actuator has a pair of terminals 1a, 1b which are connected to the electrodes thereof. A pivot 6b is fixedly mounted on the mounting plate 6 and extends through a support opening 4a formed in a first arm 4, thus pivotally supporting it. Another pivot 6a fixedly mounted on the mounting plate 6 passes through a support opening 5a formed in a second arm 5, again pivotally supporting it. A pair of pins 4b are fixedly mounted on the first arm 4, between which the lower end of the piezoelectric actuator 1 is held without leaving any clearance. A drive pin 4c fixedly mounted on the first arm 4 fits in an elongate slot 5b formed in the second arm 5. An actuator pin 5c fixedly mounted on the second arm 5 passes through an arcuate relieve slot 6d formed in the mounting plate 6 to be fitted into a U-shaped notch 7b formed in the diaphragm controlling plate 7.

Figure 3A:
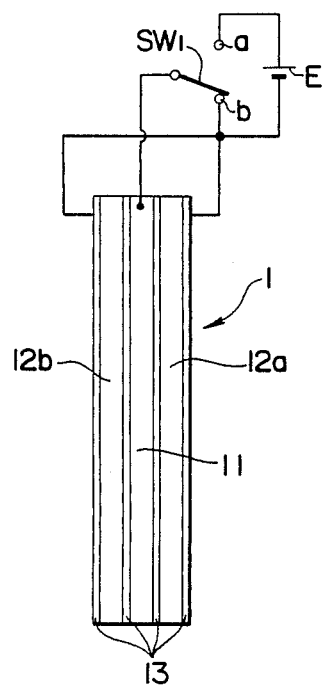
FIGS. 3A and 3B are enlarged views of a piezo-electric actuator used in the diaphragm apparatus of the invention, FIG. 3A illustrating the condition of the actuator when no voltage is applied across the piezoelectric ceramics and FIG. 3B showing the condition of the actuator when a voltage is applied thereacross.
Figure 3B:
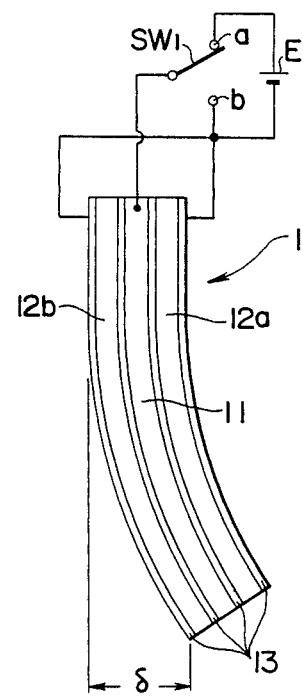

Referring to FIGS. 3A and 3B, the construction and the principle of operation of the piezoelectric actuator 1 of bimorph type which is used in the present embodiment will be described. The piezoelectric actuator 1 comprises a thin metal sheet 11, and a pair of piezoelectric ceramic members 12a, 12b which exhibit a counter-piezoelectric effect to produce a strain in response to the application of a voltage thereto and which are disposed on the opposite sides of the sheet 11 so that the directions of their polarization are symmetrical to each other. Upon application of a voltage to the individual ceramic members 12a, 12b, the member 12a shrinks while the member 12b expands or vice versa. As shown, electrodes 13 are disposed on the opposite sides of the respective ceramic members 12a, 12b. When switch $SW_1$ is turned to its contact b as shown in FIG. 3A, no voltage is applied across the ceramic members 12a, 12b. However, when the switch $SW_1$ is turned to its contact a as shown in FIG. 3B, a voltage of given magnitude is applied to the respective ceramic members 12a, 12b from a power source E. Consequently, strains are produced in the individual ceramic members 12a, 12b, whereby the piezoelectric actuator 1 is deformed by a deflection $\delta$. The magnitude of deflection $\delta$ and the applied voltage V are related to each other as previously described in connection with FIG. 23, and thus the magnitude of the deflection $\delta$ can be changed by adjusting the magnitude of the applied voltage V.

Figure 2A:
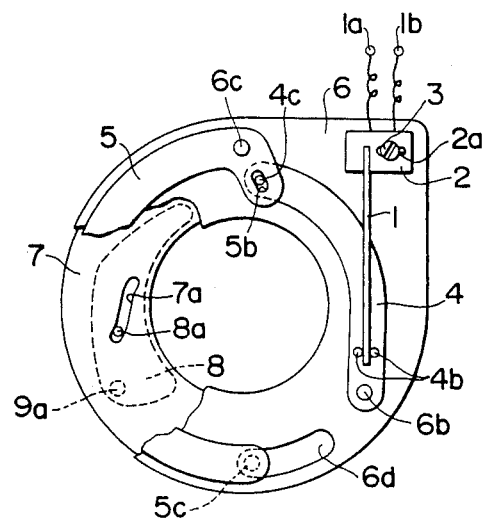
FIGS. 2A and 2B are front views of different phases of operation of the diaphragm mechanism shown in FIG. 1.
Figure 2B:
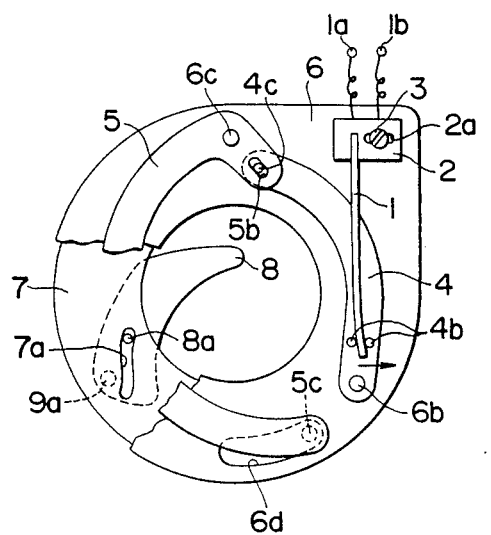
Figure 23:
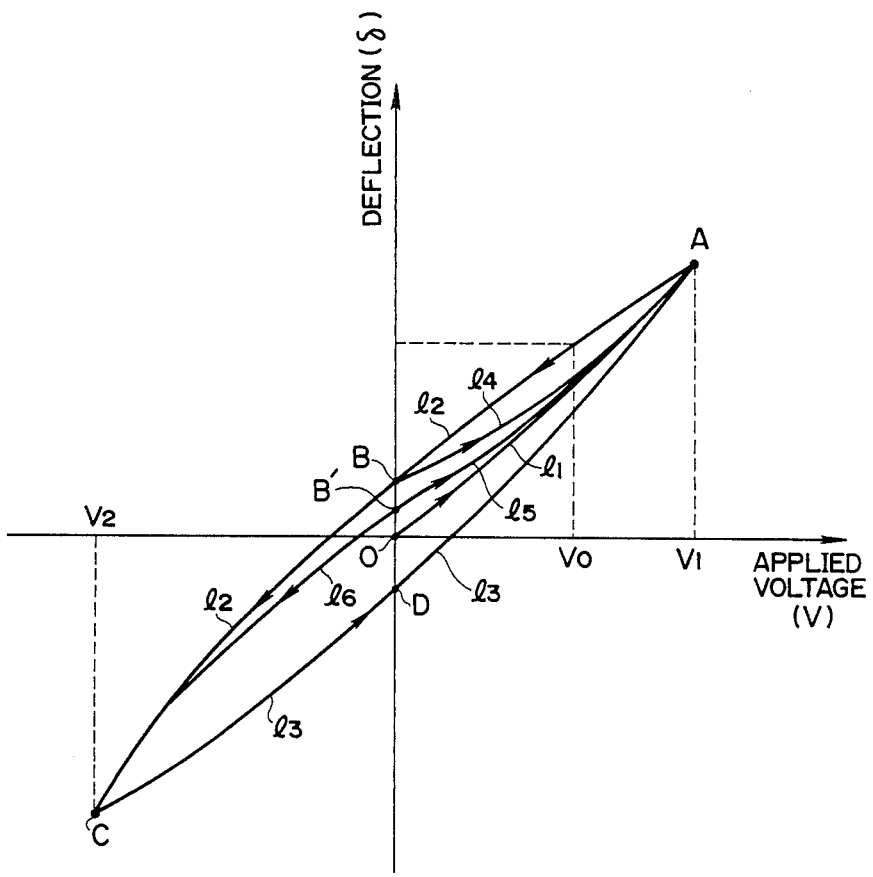
FIG. 23 graphically shows the relationship between the deflection δ and the applied voltage V of a piezoelectric actuator.

Referring to FIGS. 2A and 2B, the operation of the diaphragm apparatus shown in FIG. 1 will now be described. In FIG. 2A, the diaphragm is in its open condition. Since the actuator 1 is mounted on the mounting plate 6 in a manner to permit its lateral movement by the provision of the elongate slot 2a formed in the amount 2, any reduction in the accuracy of a diaphragm aperture which may be caused by a variation from part to part can be compensated for, thus allowing the diaphragm blades 8 to be brought to given positions in their open condition. A potential difference between the terminals 1a, 1b of the actuator 1 is equal to zero. The relationship between the applied voltage to the actuator 1 and the diaphragm aperture is established such that point B shown in FIG. 23 represents an open condition of the diaphragm blades 8 where rays of light required to perform a photographing operation are not intercepted while points B' and O represent positions of the diaphragm blades 8 where they are further retracted outwardly. Point A where the voltage $V_1$ is applied corresponds to the minimum diaphragm aperture.

When a voltage V corresponding to a proper diaphragm aperture is applied across the terminals 1a, 1b of the actuator from a drive circuit to be described later, the lower end of the actuator becomes curved in the direction of an arrow in proportion to the applied voltage, as shown in FIG. 2B. The first arm 4 then rotates clockwise about the pivot 6b, whereby the deflection of the actuator 1 is amplified, transmitting such deflection to the second arm 5. This causes the second arm 5 to rotate counter-clockwise, further amplifying the deflection. As the second arm 5 rotates, the actuator pin 5c causes the diaphragm controlling plate 7 to rotate counter-clockwise, with the result that the diaphragm blades 8 move angularly about their respective support pins 9a.

Diaphragm controlling cam slots 7a formed in the diaphragm controlling cam plate 7 are profiled to cause an inward movement of the diaphragm blades 8 to define a diaphragm aperture in proportion to the magnitude of the deflection of the piezoelectric apparatus 1. In this manner, the plurality of diaphragm blades 8 can be controlled to a given diaphragm aperture.

When returning the diaphragm to its open condition, the drive circuit, mentioned above, is operated to reduce the potential difference between the terminals 1a, 1b to zero, as will be further described later. This causes a similar operation to occur although in the opposite direction, again establishing an open diaphragm condition. When it is desired to change from a given diaphragm aperture to another diaphragm aperture continuously, it is only necessary that a voltage which corresponds to said another aperture be applied to the piezoelectric actuator.

Figure 4A:
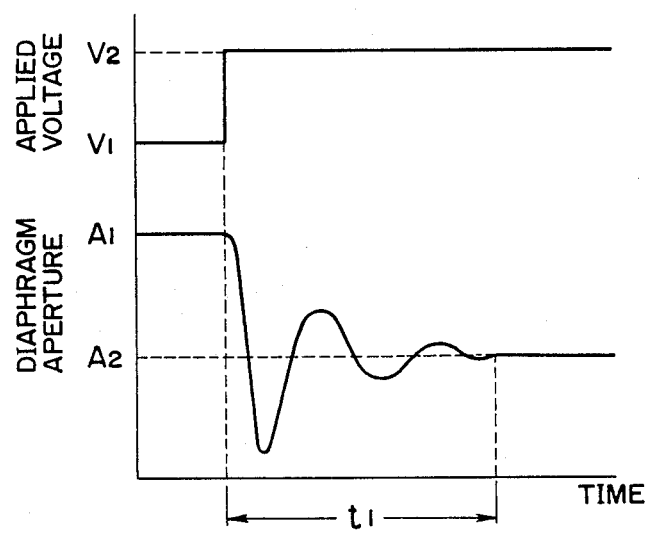
FIGS. 4A and 4B graphically show a change in the diaphragm aperture and the applied voltage with time occurring in a conventional apparatus and the apparatus of the invention.
Figure 4B:
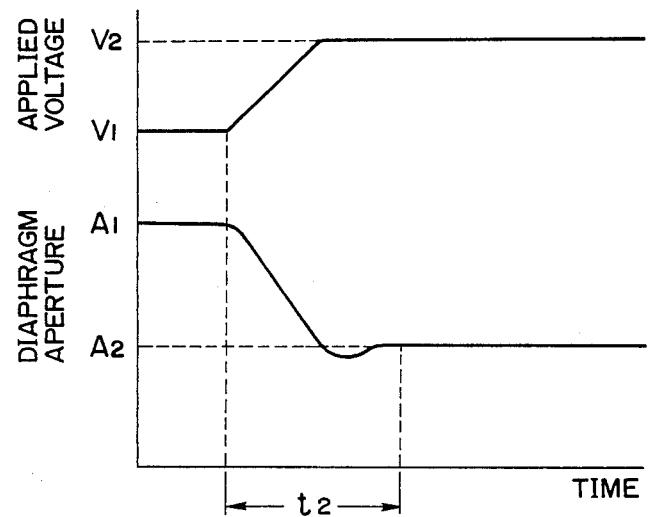

FIGS. 4A and 4B graphically show a change in the applied voltage to the piezoelectric actuator 1 and the diaphragm aperture. As shown, voltage $V_1$ corresponding to a diaphragm aperture $A_1$ is initially applied to the actuator and another voltage $V_2$ is applied to the actuator in order to change the diaphragm aperture to another value $A_2$. FIG. 4A represents the operation of a conventional diaphragm apparatus when actuated by means of a piezoelectric actuator. It will be seen that there occurs a rapid change in the applied voltage from $V_1$ to $V_2$. Since the piezoelectric actuator has a rapid response, and since the operating inertia of the diaphragm blades 8 themselves as well as of a transmission mechanism interposed in a path from the piezoelectric actuator 1 to the diaphragm blades 8 undergo an elastic deformation, an aperture defined by the plurality of diaphragm blades 8 exhibits a hunting behaviour with a gradually dimishing oscillation. Such rebounding or hunting operation of the diaphragm blades 8 takes place through a greater stroke, and it takes a relatively long time t1 until such oscillation subsides. This means that a still camera suffers from an increased time lag upon release or that a video camera experiences a non-uniform exposure. In addition, the rebounding behaviour is apt to cause a failure of diaphragm blades or an abrasion of parts.

By contrast, in accordance with the invention, a drive circuit associated with the diaphragm apparatus includes circuit means which prevents a rapid change in the applied voltage to the piezoelectric actuator 1, and such operation is illustrated in FIG. 4B. It will be seen from this Figure that the applied voltage gradually changes from $V_1$ to $V_2$, and accordingly the diaphragm aperture changes from $A_1$ to $A_2$ without any accompanying substantial rebounding behaviour. Consequently, a settling time t2 until the diaphragm aperture becomes stabilized is much less than the time t1 which results when there is a rapid change in the applied voltage. In this manner, there can be realized a camera which is substantially free from any non-uniform exposure and which involves little time lag upon release.

A drive circuit used in the diaphragm apparatus of the present embodiment will now be described with reference to FIG. 5. The drive circuit includes an Av/Tv calculator 21, to which a photometry circuit 31, film sensitivity data circuit 33 and lens fully open aperture data circuit 32 as well as a shutter control circuit 34 are connected. The circuit 21 calculates a difference $\Delta Av$ between a diaphragm aperture Av and an open diaphragm aperture Avo which is inherent to a particular lens as well as a Tv value in response to such data supplied from these associated circuits. A comparator 22 is connected to the calculator 21 for comparing a $\Delta Av$ value against digital data contained in an up/down counter 23 to deliver an output which determines whether the counter 23 is to count up or down clock pulses supplied from a clock generator 24. An output from the counter 23 is fed through a D/A converter 25 to be supplied to an output circuit 26. The output circuit 26 is connected to a high voltage source $E_0$ and applies a drive voltage which corresponds to an output from the converter 25 to the piezoelectric actuator 1.

A switch 28 is connected to the counter 23 and is mechanically interlocked with a release or preview button. When the switch 28 is turned on (i.e. closed) a counting operation by the counter 23 is enabled. An exposure terminate detector 29 delivers a forced count-down signal and an Av reset signal to the counter 23 and the calculator 21, respectively.

In the described arrangement, light from an object being photographed is received by a light receiving element contained within the photometry circuit 31, which effects a photoelectric conversion of the optical input into a digital signal, which is then fed to the calculator 21. In response to the digital signal, the calculator 21 calculates an Av value, which is then inputted to the comparator 22. The comparator 22 receives a count from the counter 23, which receives clock pulses from the clock generator 24. If the release or preview button is now depressed to turn on the switch 28, a counting operation by the counter 23 is initiated, and a trigger signal is fed to the calculator 21 in order to fix or store the Av value therein. If the Av value represents a diaphragm aperture less than that corresponding to a lens fully open aperture Avo, the comparator 22 delivers an up-count signal, causing the counter 23 to count up clock pulses from the clock generator 14.

A count in the counter 23 is sequentially fed to the converter 25, where it is converted into an analog signal to be delivered to the output circuit 26. In this manner, the output circuit 26 delivers a voltage signal to the piezoelectric actuator 1 which rises from $V_1$ to $V_2$ in a manner corresponding to the up-counting operation. When applied to the piezoelectric actuator 1, the voltage signal causes the diaphragm aperture to be controlled in the manner illustrated in FIG. 6.

Figure 6:
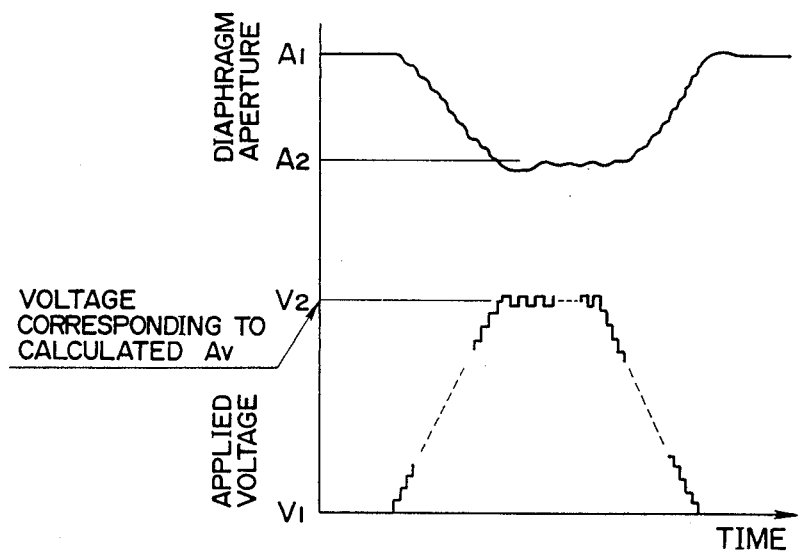
FIG. 6 graphically shows the diaphragm aperture and the applied voltage with respect to operating time which are achieved with the circuit of FIG. 5.

When the count in the counter 23 reaches the Av value which has previously been calculated by the calculator 21, the comparator 22 inverts its output, thus changing the counter 23 to a count-down mode, which therefore begins to count down. At this time, the comparator 22 delivers a count-up signal, whereby the counter 23 is switched into a count-up mode again. Because the counter 23 is alternately switched between the count-up and the count-down mode, the count will be stabilized near the calculated Av value, as shown in FIG. 6. On the other hand, an exposure period (Tv value) which has been calculated by the calculator 21 is supplied to the shutter control circuit to effect an exposure of the camera.

Upon completion of an exposure operation of the camera, the diaphragm is opened. This takes place by the exposure terminate detector 29 which detects the completion of running of shutter blades to deliver the forced count-down signal to the counter 23. Alternatively, the exposure terminate detector 29 may reset the $\Delta Av$ value in the calculator 21 to 0, as indicated by the dotted line in FIG. 5, thus forcibly opening the diaphragm. Thus, the exposure terminate detector 29 detects the completion of an exposure abrasion, and the detection signal is delivered to the calculator 21. In response thereto, the calculator 21 forcibly changes and maintains the Av value to an open value for a given time interval, thus delivering a forced count-down signal to the counter 23.

FIG. 6 shows a change in the applied voltage to the piezoelectric actuator 1 which results from a series of operations performed by the drive circuit in the manner mentioned above. It will be seen from the illustrated change in the voltage that the applied voltage to the piezoelectric actuator 1 changes at a rate which is determined by the clock frequency, which therefore can be chosen to provide a satisfactory voltage changing rate to avoid the rebounding behaviour.

Where the Av value is not fixed in the described drive circuit, it is possible to allow the piezoelectric actuator 1 to follow a change in the Av value during the exposure in a sequential manner, and such arrangement can be advantageously incorporated into a video camera or a cine camera where a servo control is required by normally detecting the controlled diaphragm aperture. A rebounding behaviour of the diaphragm is prevented if the brightness of the object being photographed changes abruptly during the servo drive.

Figure 5:
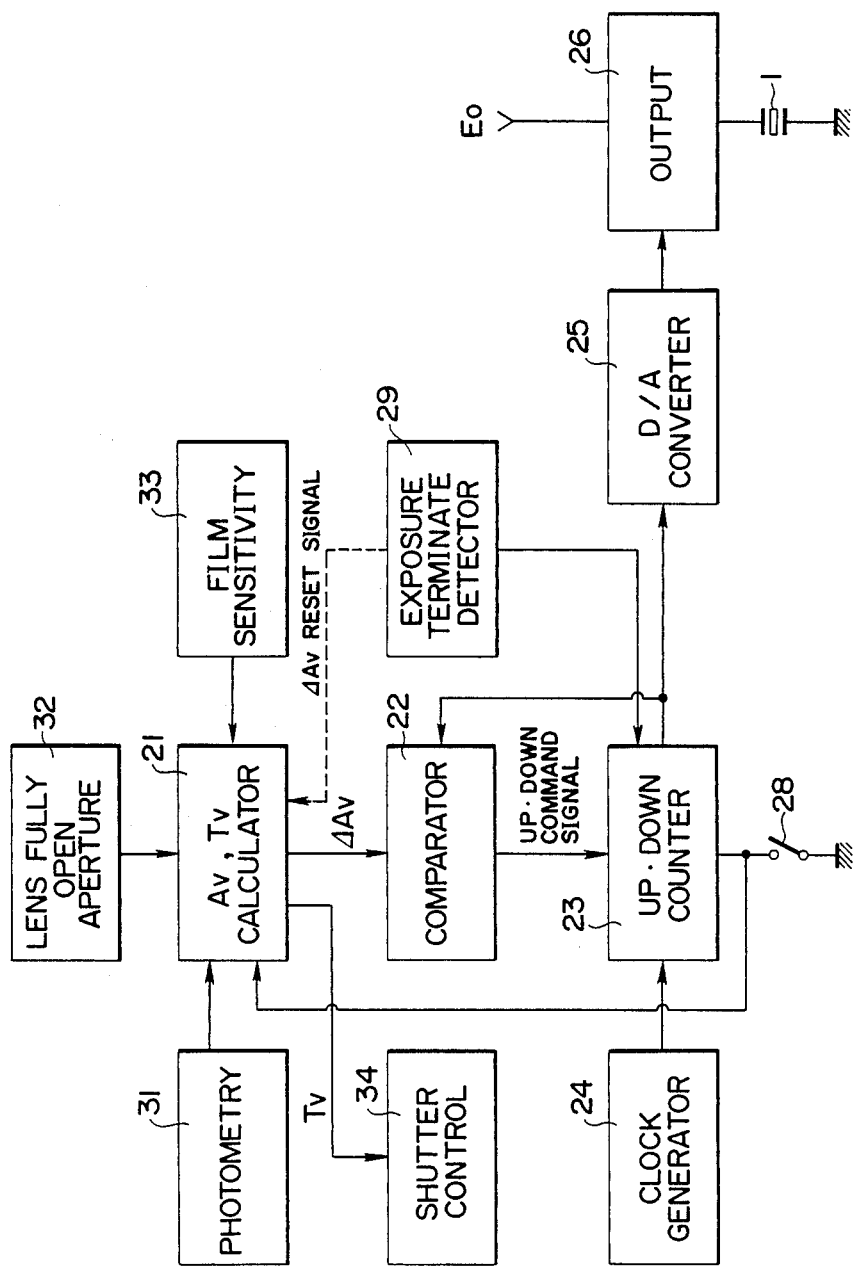
FIG. 5 is a block diagram of one form of drive circuit used in the diaphragm apparatus of the embodiment shown in FIG. 1.
Figure 7:
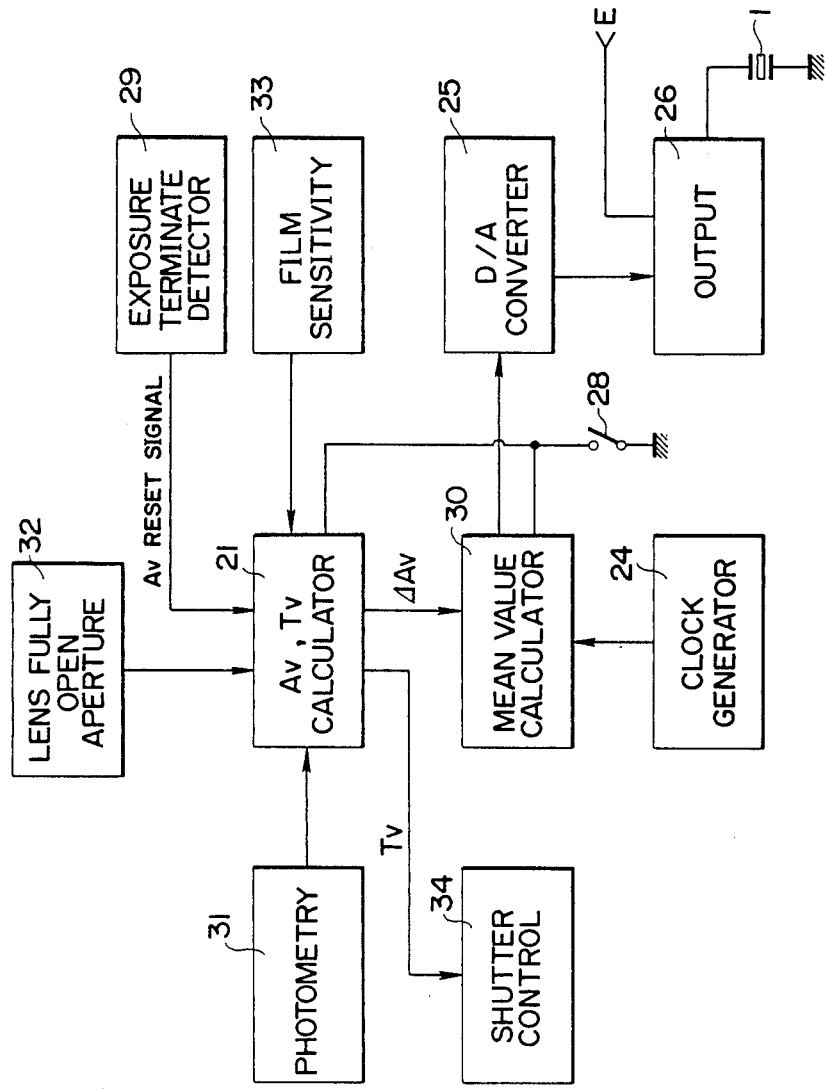
FIG. 7 is a block diagram of another form of drive circuit which may be used in the diaphragm apparatus of the embodiment.

FIG. 7 shows another form of drive circuit, which is generally similar to the drive circuit shown in FIG. 5 except for a mean value calculator 30. Accordingly, a description of the drive circuit in another respect will not be given. In this arrangement, the combination of the comparator 22 and the up/down counter 23 is replaced by the mean value calculator 30, which receives an output from the calculator 21 and which delivers an output fed to the output circuit 26 through the converter 25.

Figure 9:
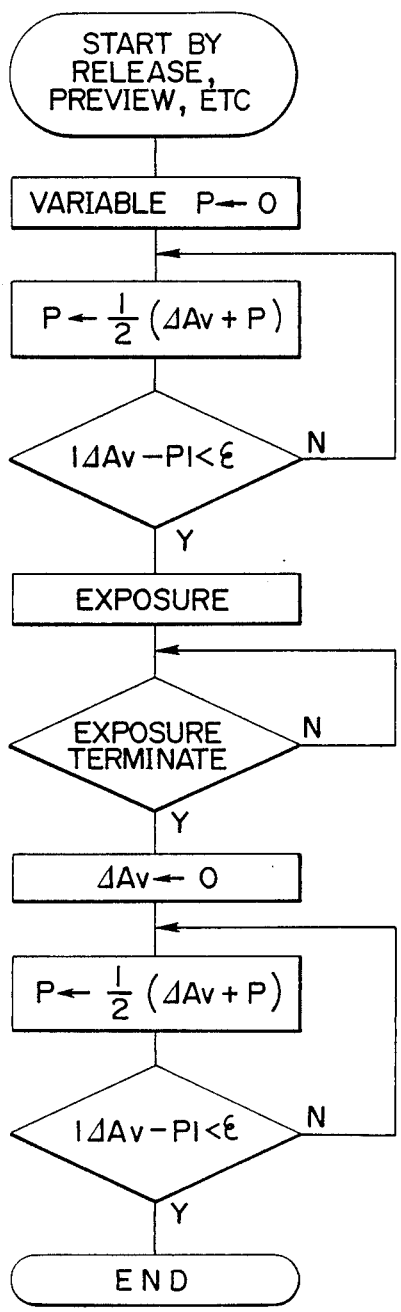
FIG. 9 is a flow chart illustrating the operation of the drive circuit shown in FIG. 7.

In the drive circuit shown in FIG. 7, when the calculator 21 calculates an Av value in response to a photometric signal from the photometry circuit 31, this value is supplied to a mean value calculator 30. If a release button or preview button is depressed under this condition to turn the switch 28 on, the mean value is calculated in accordance with the Av value by a procedure shown by a flow chart of FIG. 9. Specifically, a variable (which is denoted by P) initially reset in the calculator 30 is stored. A general formula for the variable P having an initial value of zero and for a diaphragm aperture information ΔAv is given as follows:

$$P_n \leftarrow 1/a\,(\Delta Av - P_{n-1}) + P_{n-1}\ (a > 1)$$

A new value of P is obtained by dividing the sum of the initial variable P and the value of ΔAv by two, and is then stored. If the absolute value of ΔAv−P is less than ε, or if the P value is within an error range ε from the Av value, an exposure operation is initiated. However, if P value is greater the ε, the P value is again calculated.

Figure 8:
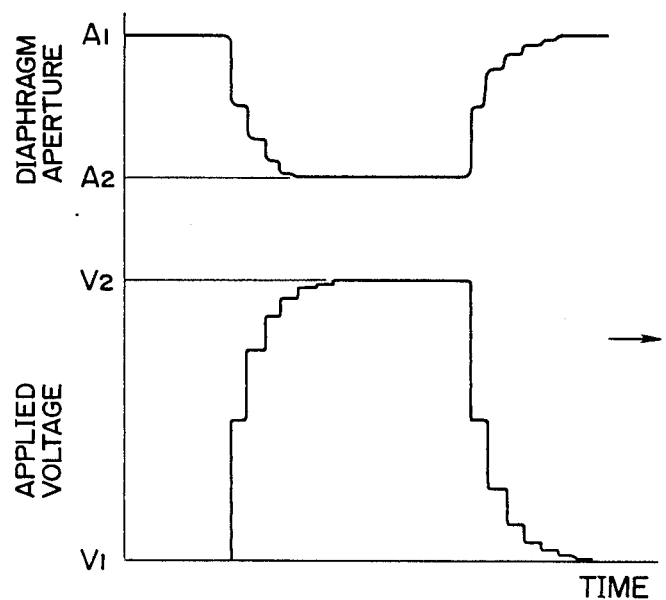
FIG. 8 graphically shows the relationship of the diaphragm apperture and the applied voltage with respect to the operating time which are obtained with the circuit shown in FIG. 7.

Upon completion of an exposure operation, an Av reset signal from the exposure terminate detector 29 resets ΔAv to a lens fully open aperture (0). Subsequently, the P value is calculated according to ½ (ΔAv+P). The calculation is terminated upon |ΔAv−P|<ε. In this manner, a calculation is made to bring P closer to the ΔAv value, thus bringing the diaphragm toward an open aperture. FIG. 8 shows such process in terms of the voltage applied to the piezoelectric actuator 1. It will be seen from this Figure that a speed which provides an optimum voltage change which avoids the rebounding behaviour, determined by the speed of calculation or clock frequency, can be selected depending on the manner of rising of the waveform.

A diaphragm apparatus which achieves the second object of the invention will now be described. As mentioned previously in connection with FIG. 23, in addition to the fact that a piezoelectric actuator exhibits a hysteresis, the residual deflection of such actuator decreases in a gradual manner when it is left unused over a prolonged period of time or when it is subjected to a rapid temperature change during such period. To accommodate for this, in accordance with the invention, a resetting operation is once performed before a diaphragm controlling operation is initiated in order to assure that the behaviour of the piezoelectric actuator is always maintained on the same curve. The resetting operation can be carried out either by moving the diaphragm blades to a minimum diaphragm aperture position shown at a point A (see FIG. 23) or by retracting the diaphragm blades to a position shown at a point C beyond the diaphragm fully open aperture position shown at points B, B', O and D.

As will be further in this embodiment, a drive circuit which is rendered operative by a release operation of a camera applies a reset voltage V₁ across the terminals 1a, 1b of the piezoelectric actuator 1 corresponding to a minimum diaphragm aperture. When the reset voltage V₁ is applied, the lower end of the actuator 1 will be curved in the direction of an arrow as indicated in FIG. 2b, assuming the condition of point A shown in FIG. 23. Accordingly, the first arm 4 rotates clockwise about the pivot 6b to amplify the deflection of the actuator 1 before it is transmitted to the second arm 5. The second arm 5 rotates counter-clockwise about the pivot 6c to further amplify such deflection to cause the diaphragm controlling plate 7 to rotate counter-clockwise. As a consequence, the diaphragm blades 8 rotate about the respective support pins 9a. The cam slots 7a formed in the diaphragm controlling plate 7 are effective to bring the plurality of diaphragm blades 8 to a position which corresponds to a minimum diaphragm aperture.

After the described resetting operation has been performed, the drive circuit applies a voltage across the terminals 1a, 1b of the actuator 1 which corresponds to a proper diaphragm aperture which has been calculated in accordance with a photometric value. Thereupon the actuator 1 deflects by an amount corresponding to such diaphragm aperture, and the various members operate in the opposite manner from that occurring during the resetting operation, whereby the plurality of diaphragm blades 8 define a given diaphragm aperture.

It will be seen that independently from the initial condition of the piezoelectric actuator 1 between points B and O in FIG. 23, the resetting operation brings it to the condition corresponding to the point A corresponding to the minimum diaphragm aperture once, and subsequent diaphragm control may take place on the curve l₂, thus assuring a definite relationship between the diaphragm aperture and the applied voltage to the actuator 1. In this manner, a diaphragm control of a high reproducibility and a high accuracy is enabled.

Figure 10B:
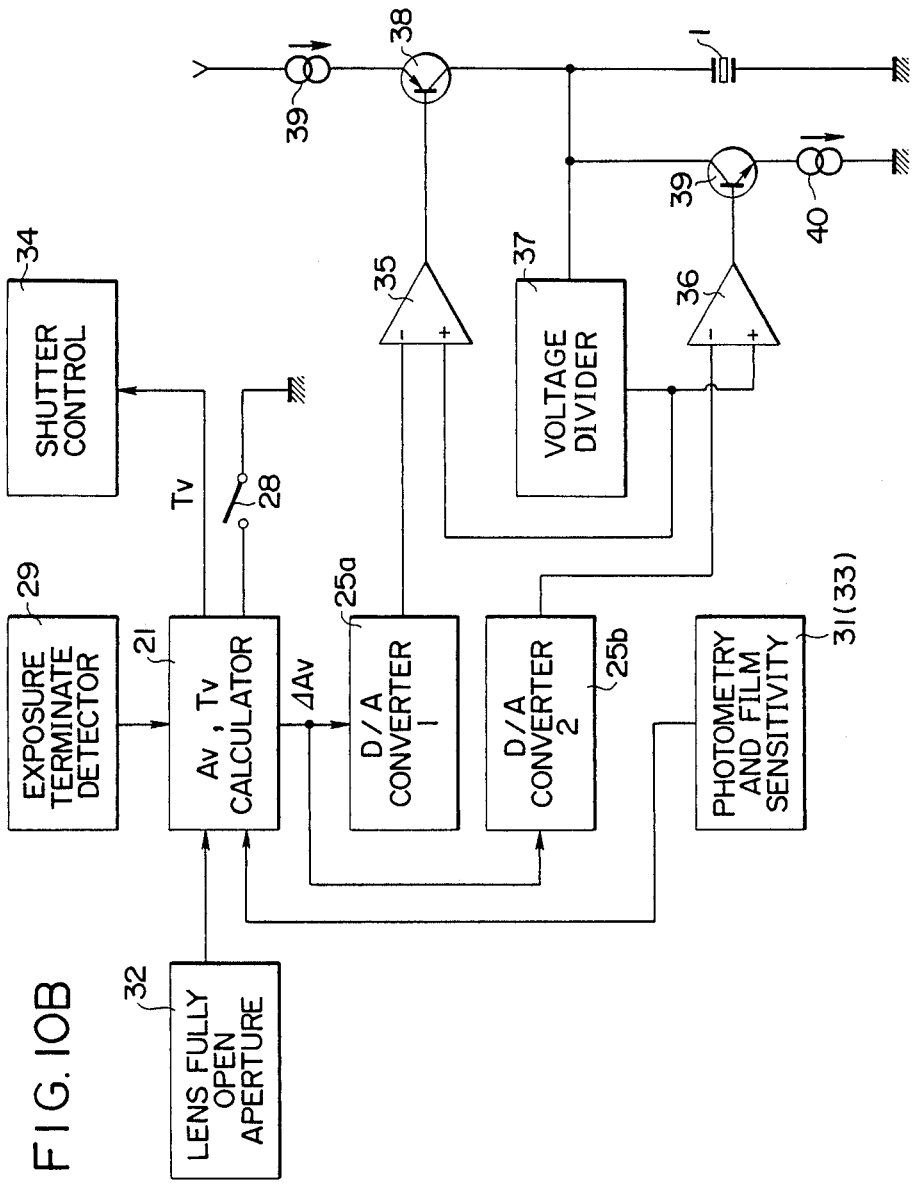

Several forms of drive circuit which perform the described sequential operation are shown in FIGS. 10A and 10B. It is to be noted that a diaphragm mechanism which is operated by such drive circuits remain the same as that shown in FIGS. 1, 2A and 2B. In FIG. 10A, a calculator 21 receives inputs from a photometry circuit and a film sensitivity data circuit 31 (33) and a lens fully open aperture data circuit 32 to calculate a difference ΔAv between a particular diaphragm aperture value Av and a fully open aperture value Avo which is specific to a particular lens as well as a Tv value. It delivers the calculated exposure period Tv to a shutter control circuit 34 and delivers the difference ΔAv value to D/A converter 25, which converts it into an analog value so as to feed a corresponding voltage to inverting input terminals of comparators 35, 36. Non-inverting input terminals receive voltages corresponding to the voltage across the piezoelectric actuator 1 as divided by voltage dividers 37a, 37b. Depending on the result of such comparison, transistors 38 and 39 are turned on and off. Constant current sources 39, 40 are used to achieve a constant rate of rising or falling of a voltage applied to the actuator 1, thus preventing an overrun or oscillations of the actuator and the diaphragm system which may be caused by a rapid voltage change. A switch 28 is mechanically interlocked with a release or preview button, and when this switch 28 is turned on, the calculator 21 delivers its ΔAv value to the converter 25.

Figure 11:
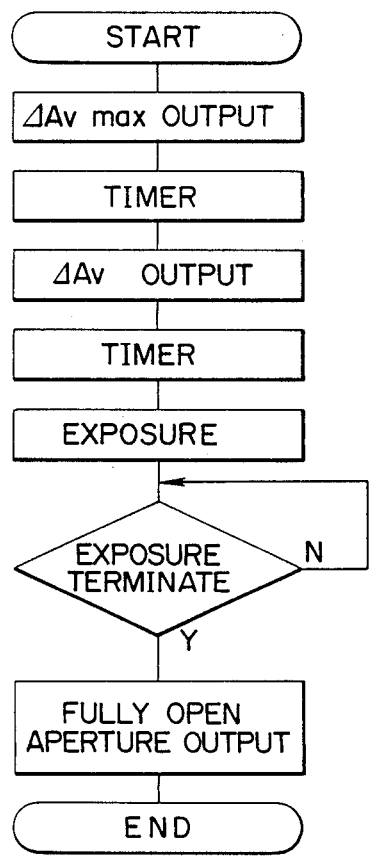
FIGS. 11 and 12 are flow charts illustrating the operation of drive circuits shown in FIGS. 10A and 10B, FIG. 11 illustrating the operation of the first embodiment and FIG. 12 illustrating the operation of a second embodiment.

FIG. 11 is a flow chart illustrating the series of operations described above. When a release or preview button is depressed, the switch 28 is turned on, and the calculator 21 initially delivers a difference ΔAv$_{max}$ between the minimum aperture and the fully open aperture which is specific to a particular lens in digital form. This digital value is converted into an analog value or voltage V, (see FIG. 13) by the converter 25. Since no voltage is applied to the actuator 1 at this time, an output from the voltage divider 37a is equal to 0 V, whereby the comparator 35 provides an output of "L" level. This turns the transistor 38 on, and the actuator 1 begins to be charged from the constant voltage source 39. If an arrangement is made such that when the charged voltage reaches v₁, an output from the voltage divider 37a becomes the voltage v₁ (see FIG. 13) and the comparator 35 change its output from its "Low" level to "High" level by using the level as a decision level to turn off the transistor 38 to cease the charging operation. Consequently, the diaphragm aperture is reduced to the minimum aperture or the point A shown in FIG. 23 at a given rate (determined by the charging current flow from the source 39). Timer interrupts the operation during the time the diaphragm aperture is reduced in this manner.

Figure 13:
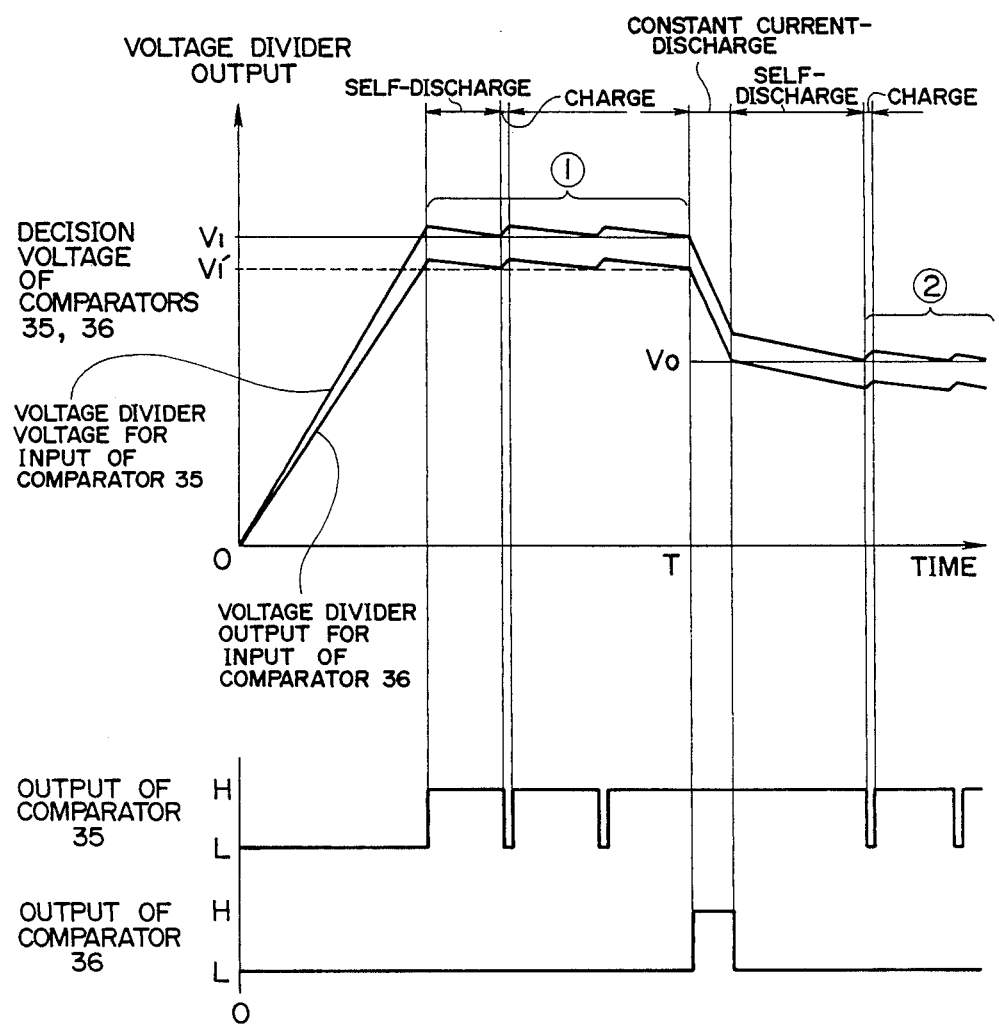
FIG. 13 is a waveform diagram of input and output voltages of a comparator shown in FIG. 10.

To provide hysteresis in the operation of the comparators 35, 36, the voltage dividers 37a, 37b are chosen so that a voltage supplied to the comparator 35 is slightly higher than a voltage supplied to the comparator 36. Hence, an output from the comparator 36 is not inverted and remains at its "L" level, whereby the transistor 39 remains off. Resulting voltages $v_1$ and $v_1'$ are shown in FIG. 13.

When a reduction in the voltage caused by a self-discharge of the actuator 1 is detected and the comparator 35 inverts, the transistor 38 is turned on, thus resuming the charging operation to maintain the voltage across the actuator 1 constant. Such operation takes place over an interval ① in FIG. 13. In the event the hysteresis is not utilized, outputs from the comparators 35 and 36 are inverted substantially simultaneously, whereby the charging and the discharge operation are repeated at very brief intervals. Since such operation takes place always when it is desired to maintain a constant diaphragm aperture, it will be seen that this would cause an increased power loss where the exposure is continued over a prolonged period of time.

Returning to the flow chart of FIG. 11, the calculator 21 delivers a $\Delta Av$ value (an amount of reduction in the diaphragm aperture from its fully open value), which is then delivered as a voltage $v_0$ from the converter 25. It will be noted in FIG. 13 that an output from the converter changes from $v_1$ to $v_0$ at time T. This corresponds to an interval ② shown in FIG. 13, and the involved operation remains the same as during the interval ①. Since the outputs from the comparators 35, 36 change to their "H" level simultaneously, the transistor 38 is turned off while the transistor 39 is turned on, whereby the constant current source 40 is effective to perform a discharge operation at a constant current rate. In this manner, the voltage is controlled to a value which corresponds to an applied voltage $V_0$ shown in FIG. 13, for example, determining the displacement of the actuator 1 on the curve $l_2$.

Subsequently, an exposure operation may take place in a known manner, and when the detector 29 indicates the termination of an exposure operation to the calculator 21, the latter delivers a fully open aperture value, and the converter 25 delivers a ground potential which corresponds thereto. This changes outputs from the comparators 35 and 36 to their "H" level, whereby the transistor 38 is turned off while the transistor 39 is turned on, allowing the applied voltage to the actuator 1 to be discharged at a constant current rate to the source 40 in order to achieve an open aperture condition.

In the drive circuit shown in FIG. 10B, D/A converters 25a and 25b serve the function of the voltage dividers 37a, 37b.

In this second embodiment of the invention, the resetting operation takes place before a diaphragm controlling operation. However, it will be appreciated that when a continuous photographing operation is performed, the resetting operation is performed only prior to the first diaphragm controlling operation, and the diaphragm controlling operation for the second cycle can be initiated without a preceding resetting operation since no significant temperature change is likely. However, it is noted that the diaphragm control operation for the first cycle would take place on the curve $l_1$ while the diaphragm control operation for the second and the subsequent cycle take place on the curve $l_4$, and therefore a corresponding applied voltage must be used. The complexity of using different values during the first and the second cycle can be avoided by a third embodiment to be described below.

A diaphragm mechanism and a drive circuit used in the third embodiment remain the same as those used in the second embodiment and shown in FIGS. 1 and 10. A first reset voltage $V_1$ corresponding to a minimum aperture is applied across the terminals 1a, 1b of the piezoelectric actuator 1 from the drive circuit, whereby the actuator assumes the condition corresponding to the point A shown in FIG. 23 and the plurality of diaphragm blades 8 are controlled to define the minimum aperture. A second reset voltage corresponding to a fully open aperture and which corresponds to a zero potential difference across the terminals 1a, 1b is applied. The actuator 1 assumes the condition corresponding to the point B shown in FIG. 23, and the plurality of diaphragm blades 8 assume their open positions.

After the described resetting operation has been performed, the drive circuit applies a voltage corresponding to a given diaphragm aperture across the terminals 1a, 1b, whereby the actuator is deflected by an amount corresponding to the given aperture, and the plurality of diaphragm blades 8 define a given aperture.

Figure 12:
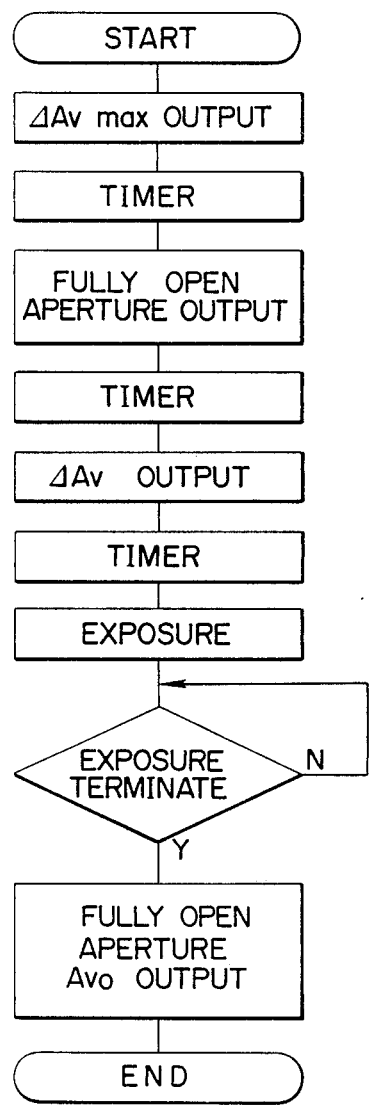

As mentioned, the drive circuit remains the same as that used in the second embodiment shown in FIG. 10, but the operation takes place according to a flow chart shown in FIG. 12, which is similar to the flow chart shown in FIG. 11 except that a difference $\Delta Av_{max}$ between the minimum aperture and a fully open aperture which is specific to a particular lens is delivered, followed by delivering an fully open aperture value and then followed by delivering a given aperture reduction value $\Delta Av$.

In the third embodiment, performing the first and the second resetting operation assures that the actuator be located at the point B whether it has initially been located anywhere between points B and O in FIG. 23. Hence, the subsequent diaphragm control may take place on the curve $l_4$ where a one-to-one correspondence is established between the diaphragm aperture and the applied voltage to the actuator 1, enabling a diaphragm control of a high reproducibility and a high accuracy. Upon completion of an exposure operation, the drive circuit removes any potential difference between the terminals 1a, 1b of the actuator 1, whereby it returns to the condition corresponding to the point B in FIG. 23, reestablishing the open aperture.

In the third embodiment of the invention, the resetting operation follows the release operation, but it should be understood that the resetting operation may be performed once upon turning on the power supply of the camera and the diaphragm control operation may be directly initiated upon release since no significant change occurs within a brief time interval in the condition of the piezoelectric actuator 1 when it assumes the condition corresponding to the point B shown in FIG. 23. For a series of successive photographing operations, the resetting operation may be performed only before the diaphragm control operation for the first cycle, and the diaphragm control operation may be directly entered during the second and subsequent cycles. In this manner, the software can be simplified since it is assured that the diaphragm control operation during the first cycle as well as the second and subsequent cycles all take place on the curve l4.

Figure 14A:
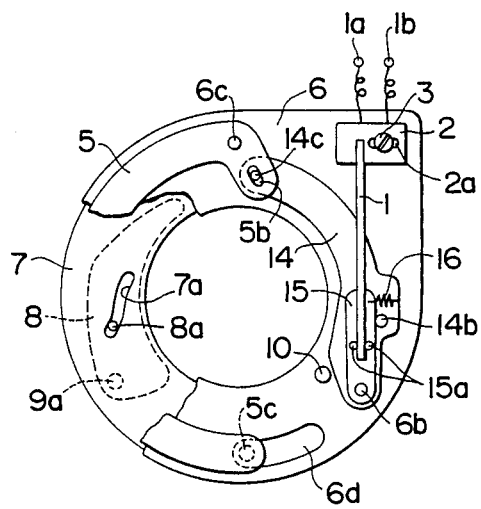
FIGS. 14A to 14C are front views of a diaphragm mechanism used in a diaphragm apparatus for a camera according to a third and a fourth embodiment of the invention, FIG. 14A showing a condition when no voltage is applied to the piezoelectric actuator, FIG. 14B showing a condition when a reverse voltage is applied to the actuator and FIG. 14C showing a condition when a forward voltage is applied to the actuator.
Figure 14B:
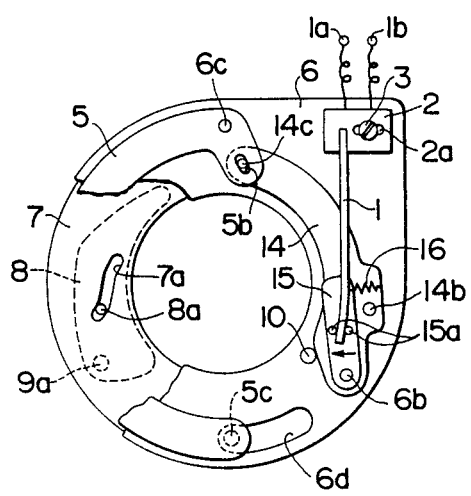
Figure 14C:
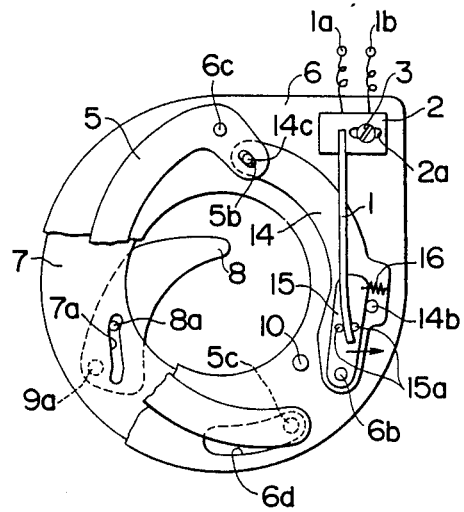

FIGS. 14A to 14C show a diaphragm mechanism according to a fourth embodiment of the invention, which is similar to the diaphragm mechanism shown in FIGS. 1, 2A and 2B except that a first arm 14 and an actuator arm 15 are both pivotally mounted on a pivot 6b which is fixedly mounted on the mounting plate 6. The lower end of a piezoelectric actuator 1 is held between a pair of pins 15a mounted on the actuator arm 15 without leaving any clearance therebetween. An abutment pin 14b is fixedly mounted on the first arm 14 and a tension spring 16 extends between the first arm 14 and the actuator arm 15, whereby the abutment pin 14b abuts against the actuator arm 15 under the initial condition. A drive pin 14c is mounted on the first arm 14 and fits into an elongate slot 5b formed in a second arm 5. A stop pin 10 is fixedly mounted on the mounting plate 6 at a location where it is capable of preventing a counter-clockwise rotation of the first arm 14 so as to prevent a fully open aperture from exceeding a given value. In other respects, the arrangement is similar to the diaphragm mechanism of the first embodiment.

FIG. 14A shows an initial condition of the diaphragm mechanism where the diaphragm presents an open aperture. A potential difference across terminals 1a, 1b of the actuator 1 is zero. A drive circuit shown in FIG. 15 and described later applies a negative reset voltage $V_2$, thus of the opposite polarity from the polarity of voltage which is used when the diaphragm aperture is to be reduced, across the terminals 1a, 1b of the actuator 1. This condition is illustrated in FIG. 14B. The actuator 1 then becomes flexed in the direction of an arrow, bringing the first arm 14 into abutment against the stop pin 10, whereby the actuator arm 15 rotates counter-clockwise while causing an elongation of the tension spring 16. At this time, the behaviour of the piezoelectric actuator 1 will initially assume a condition corresponding to a point C on the curve $l_2$ if the initial condition is at point B, and will be at a condition corresponding to point C on a curve $l_6$ if the initial condition corresponds to point B'.

After the described resetting operation, the drive circuit applies a voltage corresponding to a given diaphragm aperture across the terminals 1a, 1b of the piezoelectric actuator. This condition is illustrated in FIG. 14C. The actuator 1 is flexed in the direction of an arrow by an amount corresponding to the given diaphragm aperture, causing the actuator arm 15 to rotate through a given amount clockwise. During such rotation, the actuator arm 15 abuts against the abutment pin 14b, whereby the first arm 14 rotates integrally with the actuator arm 15, causing the plurality of diaphragm blades 8 to define a given aperture. Since the resetting operation assures that the piezoelectric actuator 1 be brought to a condition corresponding to point C despite the fact that it is initially located anywhere between points B and O shown in FIG. 13, a subsequent diaphragm control may take place on the curve $l_3$ where a one-to-one correspondence between the diaphragm aperture and the applied voltage to the actuator 1 is established, enabling a diaphragm control with a high reproducibility and with a high accuracy.

FIG. 15 shows a drive circuit used in the fourth embodiment. Av/Tv calculator 21, D/A converter 25, shutter control circuit 34, film sensitivity data circuit 33, photometry circuit 31, lens fully open aperture data circuit 32 and the like remain the same as in the previous embodiments. A voltage divider 41 divides an applied voltage to a piezoelectric actuator 1. Constant current sources 42 and 43 are used to charge and discharge the piezoelectric actuator 1 utilizing a bridge circuit comprising transistors 44, 45, 46 and 47 as well as a transistor 48 and diode 49. A switch 28 is mechanically interlocked with a release or preview button, and an exposure terminate detecting switch 50 may comprise a switch which is closed upon completion of running of second shutter blinds, for example, while a control circuit 51 is responsive to an output from a comparator 52 and an output from the calculator 21 to control the operation of the transistors 44 to 47.

Figure 16:
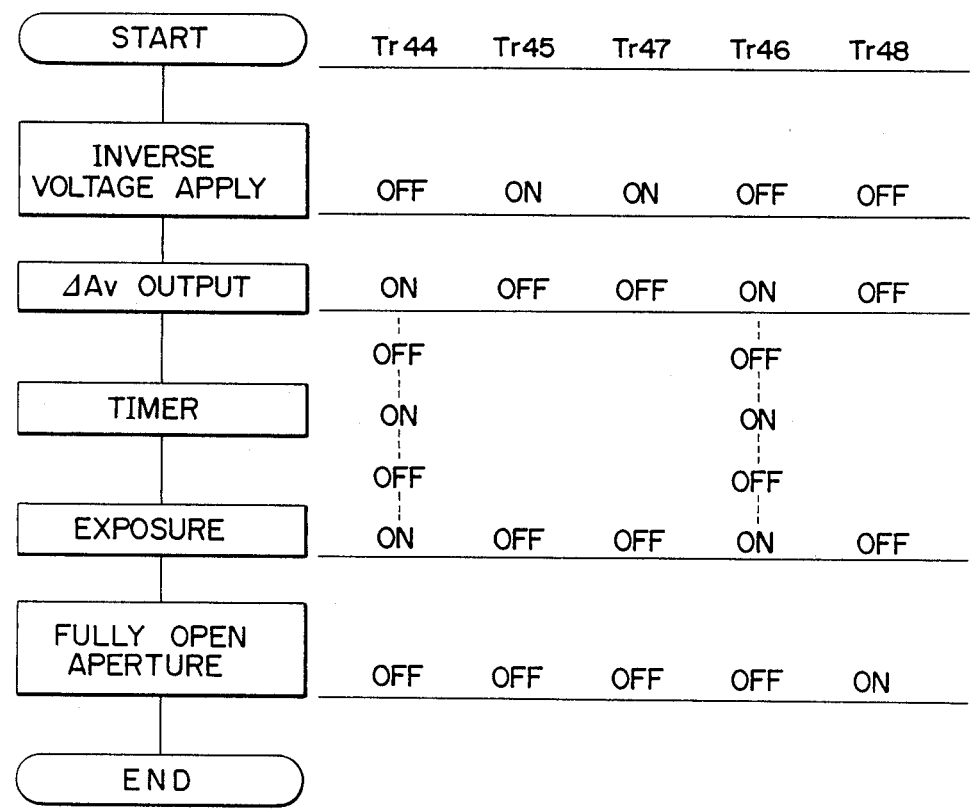
FIG. 16 is a flow chart illustrating the operation of the drive circuit shown in FIG. 15.

The operation of the drive circuit will now be described with reference to a flow chart shown in FIG. 16. In response to an input signal from a release or preview switch 28, the calculator 21 delivers a command which causes the transistor control circuit 51 to apply a reverse voltage. In response thereto, the control circuit turns the transistors 45 and 47 on. At this time, ⓑ side of the piezoelectric actuator 1 is charged to the positive polarity. The calculator 21 then ceases to deliver the reverse voltage command, and instead delivers $\Delta Av$ value, by which the diaphragm aperture is to be reduced, to the converter 25, which then delivers a voltage $v_0$ which corresponds to the aperture value to comparator 52. The comparator 52 delivers an output of "L" level, which causes the control circuit 51 to turn the transistors 45 and 47 off and to turn the transistors 44 and 46 on. The piezoelectric actuator 1 is then charged forwardly at uniform rate from the constant current source 42 whereby its ⓐ side is positive. When the output from the voltage divider 41 exceeds $v_0$, the output from the comparator 52 is inverted to its "H" level, whereby the control circuit 51 turns the transistor 44 off. If it takes a long time until the exposure operation is terminated, a self-discharge of the piezoelectric actuator may cause the voltage applied to the point ⓐ to decrease. The comparator 52 is then operative to invert its output to turn the transistor 44 on for a very brief interval, thus repeating a charging operation which lasts only for a very short time interval.

When the exposure terminate detecting switch 50 is turned on, the calculator 21 delivers a lens fully open aperture value ($\Delta Av=0$) to the converter 25 and simultaneously feeds an exposure terminate signal to the control circuit 51. In response thereto, the control circuit 51 turns only the transistor 48 on, whereby the constant current source 43 is effective to discharge the piezoelectric actuator 1 at a uniform rate through the diode 49, the actuator 1 eventually reaching the condition corresponding to the point B shown in FIG. 23 where the diaphragm assumes its open aperture.

Again, in the present embodiment, it is acceptable that the resetting operation takes place only prior to the diaphragm control operation of the first cycle, and the diaphragm control operation for the second and subsequent cycles may be directly entered without a preceding resetting operation. However, it will be seen that during and subsequent to the second cycle, the actuator 1 will follow the curve l4 shown in FIG. 13 and a corresponding applied voltage must be used.

Alternatively, for a series of successive photographing operations, the resetting operation described above is performed prior to the diaphragm control of the first cycle, and after the exposure operation of the first cycle has been completed, the reset voltage $V_2$ may be directly applied across the terminals 1a, 1b of the piezoelectric actuator 1 to perform a resetting operation, followed by a diaphragm control operation of a second cycle and/or subsequent cycle.

A fifth embodiment of the invention will now be described, utilizing a diaphragm mechanism which is similar to that used in the fourth embodiment shown in FIGS. 14A to 14C. In this instance, after the power supply to a camera is turned on, a drive circuit, to be described later, applies a first reset voltage $V_2$ of a negative polarity, thus, of the opposite polarity from that which is used when reducing the diaphragm aperture, across terminals $1a$, $1b$ of a piezoelectric actuator 1. This brings the actuator 1 to point C in FIG. 23. Subsequently, a second reset voltage corresponding to a fully open aperture or zero difference is applied across the terminals $1a$, $1b$ of the actuator 1.

Figure 17:
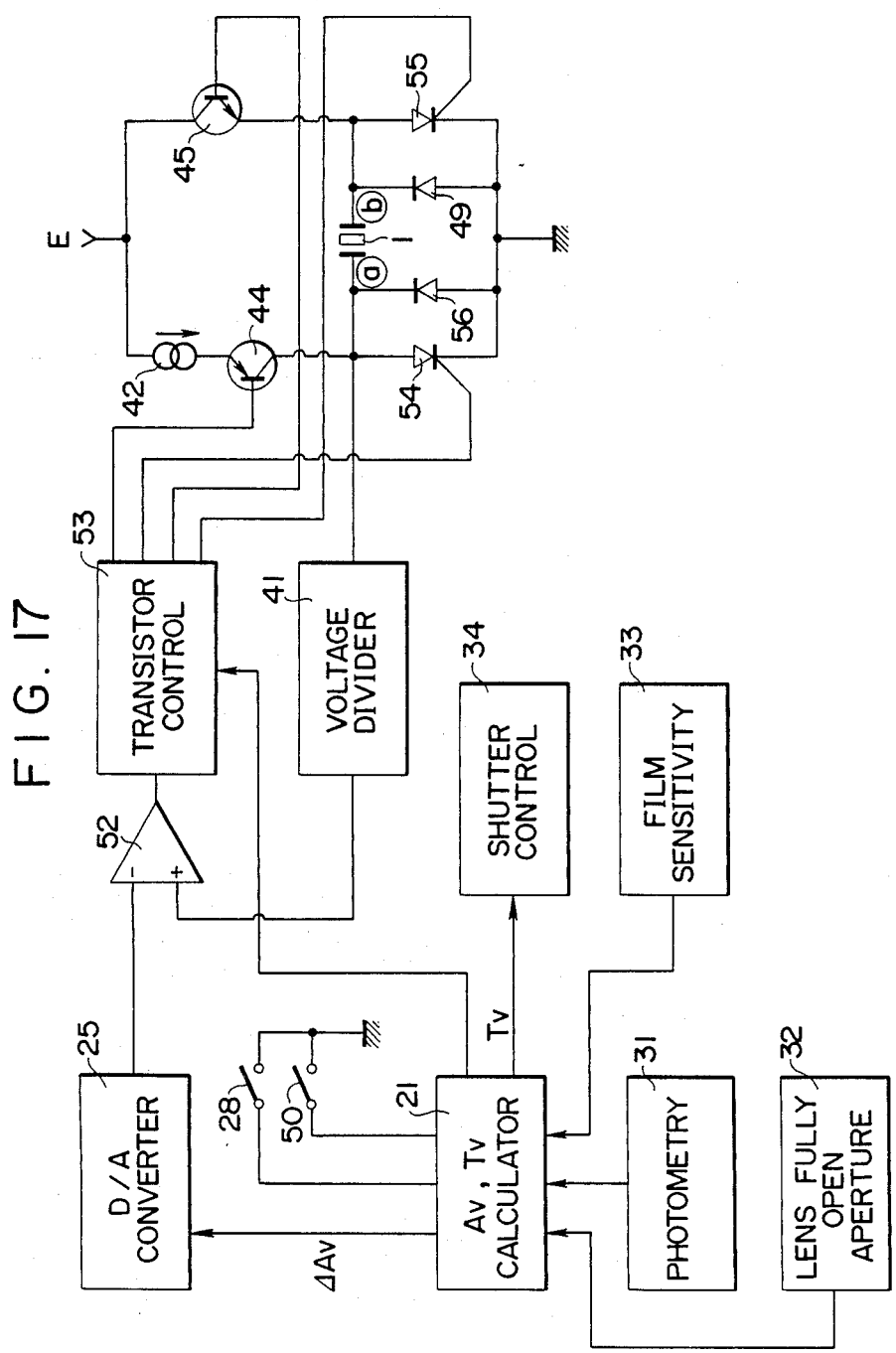
FIG. 17 is a block diagram of a drive circuit which is used to operate the diaphragm mechanism of the fourth embodiment shown in FIGS. 14A to 14C.

The arrangement of the drive circuit of the fifth embodiment is shown in FIG. 17 and includes Av/Tv calculator 21, D/A converter 25, release/preview interlocked switch 28, exposure terminate detecting switch 50, comparator 52, voltage divider 41, shutter control circuit 34, film sensitivity data circuit 33, photometry circuit 31 and lens fully open aperture data circuit 32, all of which are constructed in the same manner as described above in connection with the fourth embodiment. A transistor control circuit 53 is responsive to an output from the comparator 52 and an output from the calculator 21 to control transistors 44, 45 and thyristors 54, 55. In addition, a constant current source 42 is used, and diodes 56, 49 are provided to discharge a piezoelectric actuator 1.

Figure 18:
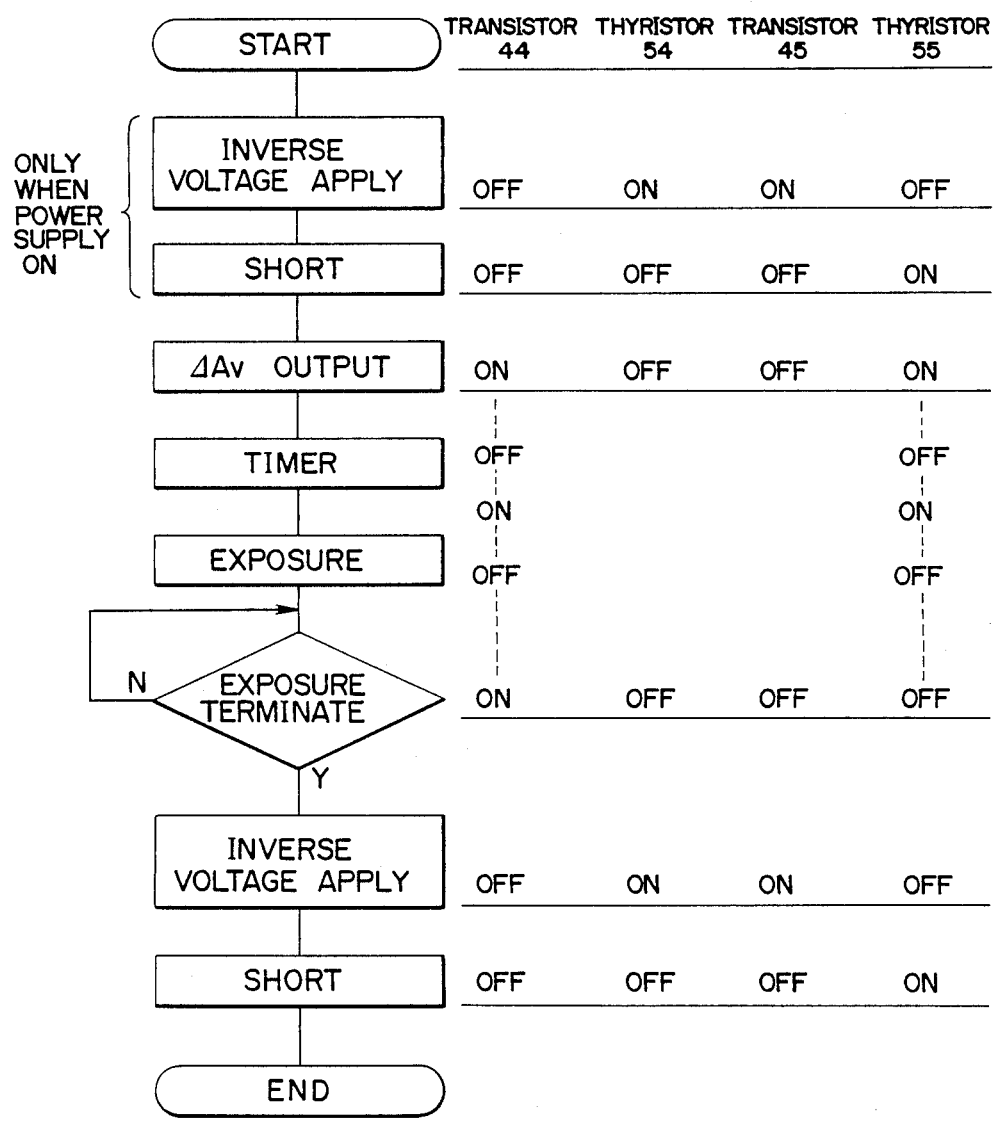
FIG. 18 is a flow chart illustrating the operation of the drive circuit shown in FIG. 17.
Figure 19:
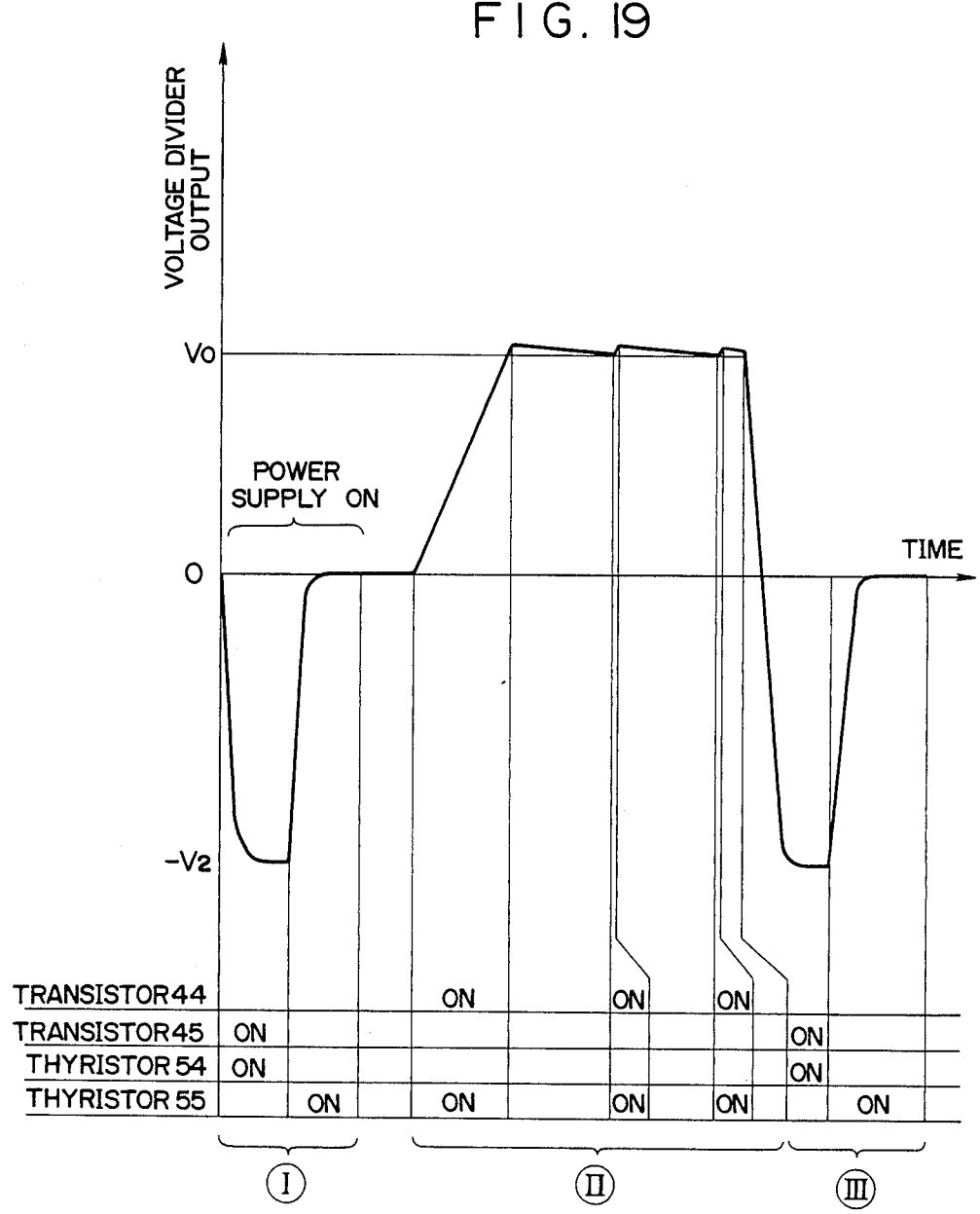
FIG. 19 is a waveform diagram illustrating a change in an output from a voltage divider shown in FIG. 17 with time.

The operation of the fifth embodiment will be described with reference to a flow chart shown in FIG. 18. Initially, the resetting operation which takes place upon switching on the power supply. Upon power on, the calculator 21 delivers a reverse voltage signal to the transistor control circuit 53, which responds thereto by turning on the transistor 45 and the thyristor 54 simultaneously. This charges the piezoelectric actuator 1 instantaneously with its ⓑ side being positive. When the charging current reduces below the holding current of the thyristor 54, the latter is turned off, thus completing the charging operation in the reverse direction. The actuator 1 now assumes a condition corresponding to a point C shown in FIG. 23, and a first resetting operation is completed. The calculator 21 then delivers a short signal to the control circuit 53, which in turn delivers a trigger signal to the thyristor 55. At this time, the charge on the actuator 1 is discharged through a closed circuit including the thyristor 55 and the diode 56. When the discharge current reduces below the holding current of the thyristor 55, the latter is turned off, and at this time, the voltage across the piezoelectric actuator 1 is substantially equal to zero, assuming a condition corresponding to a point D shown in FIG. 23. This completes a second resetting operation. The operation of this phase is shown as Ⓘ section in FIG. 19.

In response to a release operation of a camera, the drive circuit applies a voltage corresponding to a given diaphragm aperture across the terminals a, b of the piezoelectric actuator 1, which is then flexed by an amount corresponding to such aperture, allowing a plurality of diaphragm blades 8 to define a given aperture. It will be appreciated that the resetting operation brings the piezoelectric actuator to a condition corresponding to point D in FIG. 23 regardless of any initial condition assumed by the actuator prior to switching the power supply on. Accordingly, a subsequent diaphragm control may take place on the curve $l_3$ where a one-to-one correspondence between the aperture and the applied voltage to the actuator 1 is reliably established, enabling a diaphragm control with a high reproducibility and accuracy.

Upon completion of an exposure operation, the drive circuit sequentially applies the first and the second reset voltage across the terminals a, b of the actuator, thus performing the resetting operation. The circuit operation takes place according to a flow chart shown in FIG. 18. When the power supply is turned on, as the switch which is mechanically interlocked with a release or preview button is turned on subsequent to the resetting operation, the calculator 21 a digital $\Delta Av$ value to the converter 25, which in turn delivers an analog voltage $v_0$ which is equivalent thereto to the comparator 52. Since the voltage which is now applied across the actuator 1 is substantially equal to zero, an output from the voltage divider 41 is also substantially equal to zero, and thus, the comparator 52 delivers an output of "L" level. This signal causes the transistor control circuit 53 to turn the transistor 44 and the thyristor 55 on, whereby the actuator 1 is charged at a uniform current flow from the constant current source 42.

When the output from the voltage divider 41 exceeds $v_0$, the output from the comparator 52 is inverted to its "H" level, whereby the control circuit 53 turns the transistor 44 off, whereby the current ceases to flow through the thyristor 55, which is therefore turned off. For an increased length of time until the completion of an exposure operation, the applied voltage across the actuator 1 may decrease due to its self-discharge. The comparator 52 is effective to deliver an output of "L" level in each instance, causing the control circuit 53 to turn the transistor 44 and the thyristor 55 on to achieve a charging operation for a very brief time interval. This operation is illustrated as phase Ⓘ in FIG. 19.

Subsequently, when the exposure terminate detecting switch 50 (which may comprise a switch which is closed upon completion of running of a second shutter blind) is turned on, the calculator 21 delivers a reverse voltage signal to the transistor control circuit 53, which then turns the transistor 44 off and turns the thyristor 54 and the transistor 45 on. This allows the piezoelectric actuator 1 to be charged in the opposite direction with its ⓑ side being positive. The subsequent operation takes place in a similar manner as during the resetting operation which took place upon power on. This operation is shown as phase Ⓘ in FIG. 19.

As described, in the present embodiment, the resetting operation takes place upon power on and upon completion of an exposure operation, recognizing the fact that the condition of a piezoelectric actuator remains substantially unchanged over the time interval which extends from the turn-on of the power supply to the camera until the initiation of the first release operation or over a time interval during release operation when the power supply is on. This means that the resetting operation takes place prior to a photographing operation. This enables a diaphragm control operation to be initiated immediately upon release, thus providing a camera having a reduced release time lag.

Figure 20:
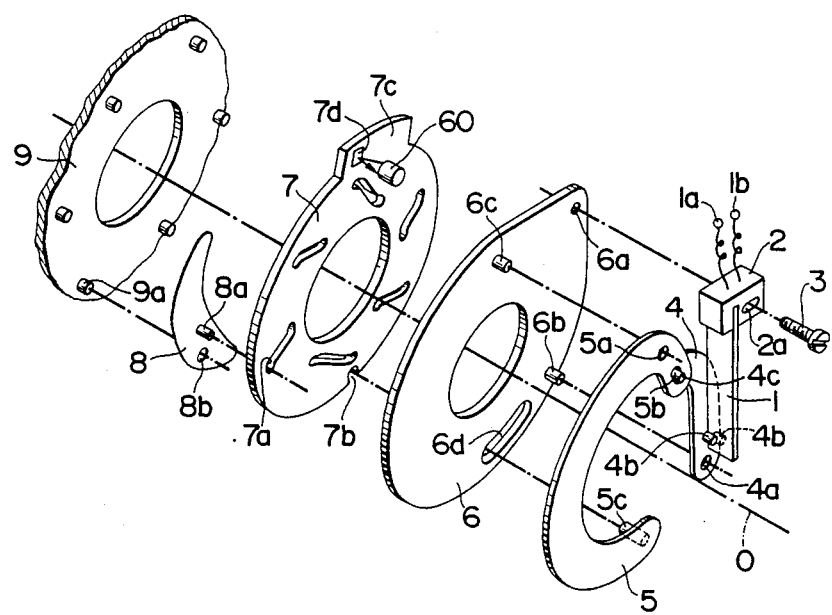
FIG. 20 is an exploded perspective view of a diaphragm mechanism used in a diaphragm apparatus for a camera according to a fifth embodiment of the invention.
Figure 21:
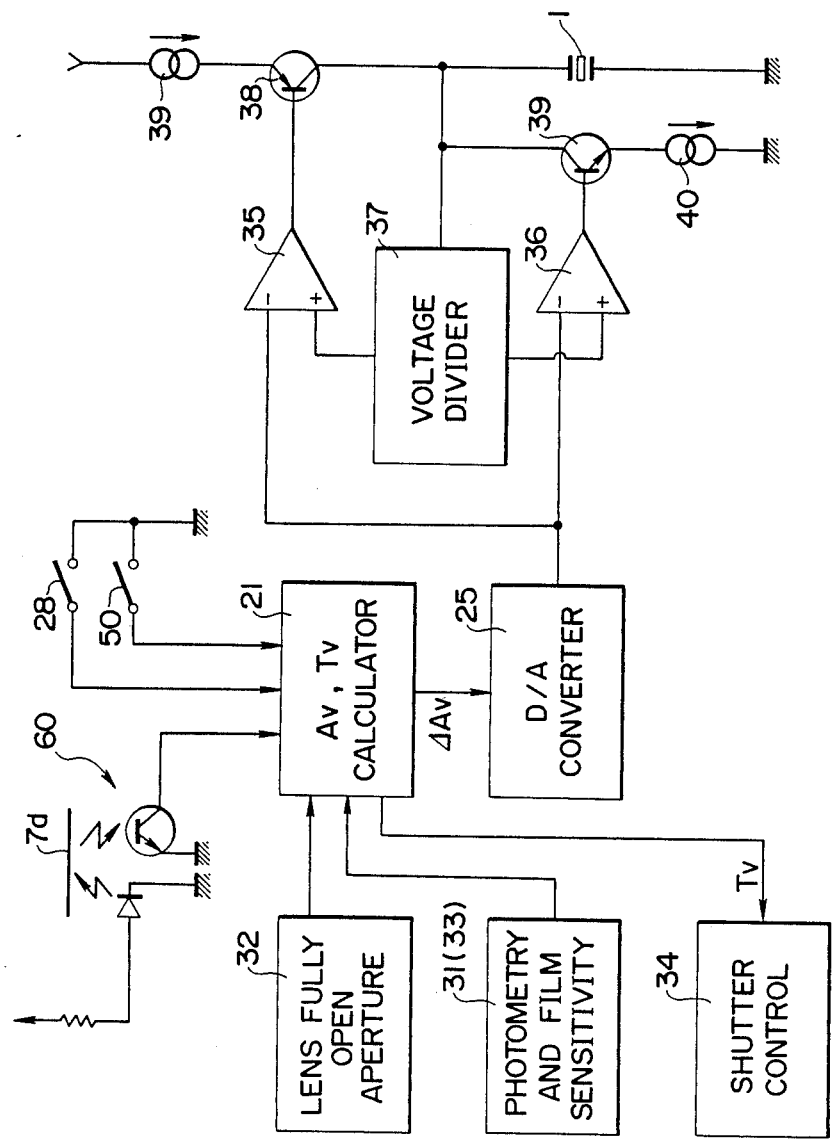
FIG. 21 is a block diagram of a drive circuit which is used to operate the diaphragm mechanism of the fifth embodiment shown in FIG. 20.
Figure 22:
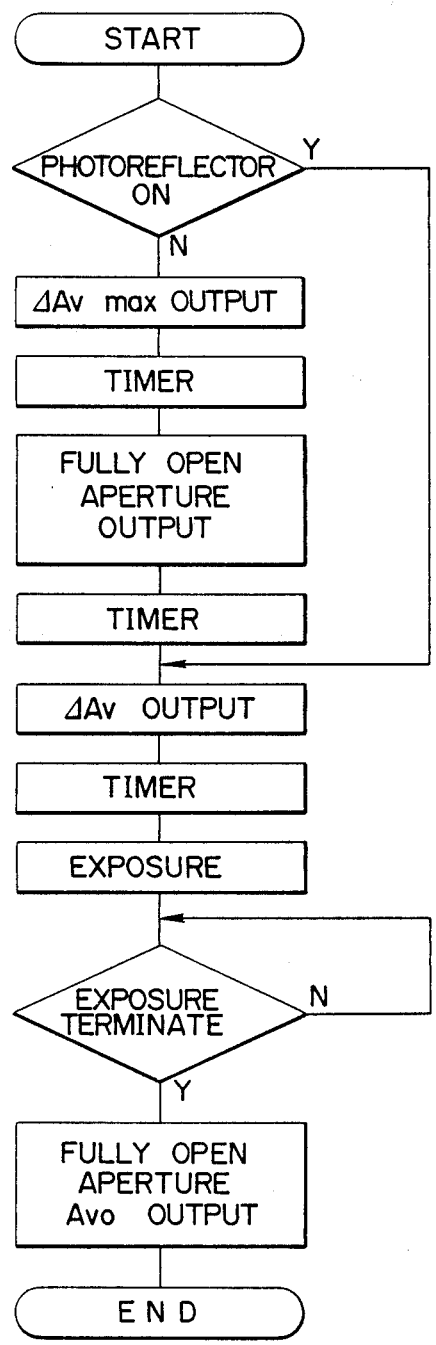
FIG. 22 is a flow chart illustrating the operation of the drive circuit shown in FIG. 20.

FIGS. 20 to 22 show a diaphragm apparatus according to a sixth embodiment of the invention. In FIG. 20, a diaphragm controlling plate 7 includes a low reflectivity area $7c$ and a high reflectivity area $7d$. A photoreflector 60 comprising a combination of light emitting and light receiving element receives a reflection signal from the high reflectivity area 7d only when a piezoelectric actuator 1 assumes the condition corresponding to point B in FIG. 23, providing an active signal to Av/Tv calculator 21 shown in FIG. 21. Other components remain the same as those used in the first embodiment shown in FIG. 1, and therefore will not be described.

Referring to FIG. 21, a drive circuit shown operates in response to a release operation of a camera to determine whether the piezoelectric actuator 1 assumes the condition corresponding to point B shown in FIG. 23 in accordance with an output from the photo-reflector 60. If the actuator assumes a condition corresponding to point B, it applies a voltage corresponding to a given aperture across terminals 1a, 1b of the actuator 1. Otherwise, the drive circuit sequentially applies a first reset voltage corresponding to a minimum aperture and a second reset voltage corresponding to a lens fully open aperture to perform a resetting operation, followed by the application of a voltage corresponding to a given aperture. In this manner, the piezoelectric actuator 1 is effective to define a given aperture.

After an exposure operation, the drive circuit shown in FIG. 21 reduces a potential difference across the terminals 1a, 1b of the actuator 1 to zero, with the consequence that the piezoelectric actuator 1 resumes the condition corresponding to point B in FIG. 23, establishing an open aperture.

The drive circuit shown in FIG. 21 is similar to the drive circuits described above in connection with the third and the fourth embodiment except that the Av/Tv calculator 21 is fed with an output from the photo-reflector 60, and in other respects, the arrangement is similar to that shown in FIG. 10 and therefore will not be described.

When the switch 28 is turned on in response to a release operation, the operation is initiated in accordance with the flow chart shown in FIG. 22. An output from the photo-reflector 60 will be at its "L" level if the piezoelectric actuator 1 is located at point B in FIG. 23, whereby the calculator 21 calculates a ΔAv value, representing a reduction in the aperture from its fully open value, based on data which are supplied thereto from the lens fully open aperture data circuit 32, and photometry/film sensitivity data circuit 31 (33), and feeds such value to D/A converter 25. After D/A conversion, the converter 25 delivers a voltage $v_0$ corresponding to such digital value to a pair of comparators 35, 36. Since the actuator 1 is located at point B in FIG. 23, an output from the voltage divider 37 is zero, and hence the comparators 35, 36 provide outputs of "L" level, whereby the transistor 38 is turned on while the transistor 39 is turned off, thus charging the actuator 1 from the constant current source 39.

If the actuator 1 is not located at point B in FIG. 23, an output from the photo-reflector 60 will be at its "H" level or off, and accordingly the calculator 21 delivers a minimum reduction in the aperture from its open aperture value or $\Delta Av_{max}$ to the converter 25, which in turn delivers a voltage $v_1$. Outputs of "L" level from the comparators 35, 36 are effective to turn the transistor 38 on and the transistor 39 off, whereby the piezoelectric actuator 1 is charged by a constant current flow, establishing a minimum aperture. Subsequently, the calculator 21 delivers an open aperture value, and the converter 25 delivers 0 V. Accordingly, the comparators 35, 36 provide outputs of "H" level, which are effective to turn the transistor 38 off and to turn the transistor 39 on, causing the actuator to be discharged to the constant current source 40. Subsequently, a desired reduction in the aperture from the fully aperture ΔAv is delivered, whereby the flow chart merges with the operation which is adopted when the piezoelectric actuator 1 assumed the condition corresponding to the point B. Thus, the actuator 1 is charged by a constant current flow, and upon completion of an exposure operation, the converter 25 delivers 0 V, and the comparators 35, 36 provide outputs of "H" level, thus turning the transistor 38 off and turning the transistor 39 on to cause a constant current discharge of the actuator 1, which then returns to point B in FIG. 23.

As described in the present embodiment, the diaphragm control always takes place on the curve $l_4$ shown in FIG. 23 which enables a diaphragm control with a high reproducibility. The resetting operation does not occur normally, but take place only when it is required, thus providing a power saving camera.

What is claimed is:

1. A diaphragm control apparatus for a camera, comprising:
   (a) voltage-displacement conversion means for producing a displacement which is controlled in accordance with an applied voltage level;
   (b) a diaphragm drive mechanism connected to the conversion means and operated by the displacement of the conversion means to achieve an aperture corresponding to such displacement;
   (c) diaphragm controlling information generating means for determining a diaphragm aperture and generating an electrical signal representing diaphragm controlling information; and
   (d) a control unit connected to the diaphragm controlling information generating means and receiving the electrical signal, the control unit producing a voltage required by the conversion means in order to obtain the determined aperture, the control unit controlling its output voltage to change the voltage gradually from zero to approach the required voltage with time and to gradually return the voltage to zero after the completion of the exposure operation.

2. A diaphragm control apparatus according to claim 1 in which the voltage-displacement conversion means comprises a piezoelectric actuator of bimorph type, and in which the diaphragm drive mechanism comprises a diaphragm ring for opening and closing diaphragm blades, and an amplifying mechanism for amplifying a displacement produced by the piezoelectric actuator to be transmitted to the diaphragm ring.

3. A diaphragm control apparatus according to claim 2 in which the amplifying mechanism includes a fulcrum located around the optical axis of an aperture used for a photographing operation, and includes a shorter arm and a longer arm which is configured to be curved along the periphery of the aperture, the longer arm having its end operatively connected to the diaphragm ring while the shorter arm has its end operatively connected to the piezoelectric actuator.

4. A diaphragm control apparatus according to claim 1 in which the diaphragm controlling information generating means includes a photometry circuit which effects a photometry of light from an object being photographed to produce an electrical signal, an output from the photometry circuit being used to determine a diaphragm aperture.

5. A diaphragm control apparatus according to claim 1 in which the control unit includes means for producing an output voltage which changes with time in a gradual manner to a voltage corresponding to the diaphragm controlling information, means for determining whether the output voltage is within a given range from a voltage corresponding to the diaphragm controlling information, and means for interrupting a change in the output voltage in response to the determination.

6. A diaphragm control apparatus according to claim 5 in which said means for changing the output voltage comprises calculation means performing a calculation according to the following formula $$P_n \leftarrow 1/a(\Delta Av - P_{n-1}) + P_{n-1} \quad (a > 1)$$

where $\Delta Av$ represents the diaphragm controlling information, and P a variable having an initial value of zero, and a D/A converter operatively connected to the calculation means to produce an output voltage in accordance with the variable P.

7. A diaphragm control apparatus according to claim 5, further including means for forcibly reducing the diaphragm controlling information Av to zero upon completion of an exposure operation.

8. A diaphragm control apparatus according to claim 1 in which the control unit includes a constant current source, a semiconductor control element connected between the constant current source and the piezoelectric actuator, means directly connected to the piezoelectric actuator for detecting an applied voltage thereof, and comparison means for comparing the detected voltage against a voltage which relates to the diaphragm controlling information and for rendering the semiconductor control element conductive until the detected voltage reaches the voltage which is related to the diaphragm controlling information.

9. A diaphragm control apparatus according to claim 8 in which the control unit includes a constant current source, a semiconductor control element connected between the constant current source and the piezoelectric actuator, means directly connected to the piezoelectric actuator for detecting an applied voltage thereof, and comparison means for comparing the detected voltage against a voltage which relates to the diaphragm controlling information and for rendering the semiconductor control element conductive until the detected voltage reaches the voltage which is related to the diaphragm controlling information.

10. A diaphragm control apparatus according to claim 9 in which the semiconductor control element comprises a transistor.

11. A diaphragm control apparatus according to claim 2 wherein said amplifying mechanism comprises mechanical means responsive to the movement of said piezoelectric actuator for increasing the displacement output of said actuator.

12. A diaphragm control apparatus for a camera, comprising:
(a) voltage-displacement conversion means for producing a displacement which is controlled in accordance with an applied voltage level;
(b) a diaphragm drive mechanism connected to the conversion means and operated by the displacement of the conversion means to achieve an aperture corresponding to such displacement;
(c) diaphragm controlling information generating means for determining a diaphragm aperture and generating an electrical signal representing diaphragm controlling information; and
(d) a control unit connected to the diaphragm controlling information generating means and receiving the electrical signal, the control unit producing a voltage required by the conversion means in order to obtain the determined aperture, the control unit controlling its output voltage to change the voltage gradually from zero to approach the required voltage with time;
said control unit comprising a clock generator for producing a signal having a given period, an up-/down counter responsive to the clock generator for counting the clock signal, means for producing a start signal which enables an up-counting operation of the counter, and comparison means operatively connected to the counter and the diaphragm controlling information generating means and operative to compare a count in the counter against diaphragm controlling information from the generating means to deliver an up-count command signal until the count reaches the diaphragm controlling information and to produce a down-count command signal thereafter, and in which the voltage generating means includes a count-to-voltage converter for producing an output voltage fed to the voltage-displacement conversion means in accordance with the count in the counter.

13. A diaphragm control apparatus according to claim 12 in which said means for producing a start signal produces a start signal in response to a release signal.

14. A diaphragm control apparatus according to claim 12 in which the count-to-voltage converter comprises a D/A converter.

15. A diaphragm control apparatus according to claim 12, further including an exposure terminate detector operative to detect the establishment of a proper exposure and to deliver a down-count command signal to the counter, the signal from the detector overriding any command signal from the comparison means applied to the counter.

16. A diaphragm control apparatus for a camera, comprising
(a) a diaphragm mechanism for controlling incidence of light onto a film surface;
(b) a piezoelectric actuator of bimorph type operatively connected to the diaphragm mechanism and including a capacitive component which imparts a diaphragm driving force to the diaphragm mechanism;
(c) means for producing an electrical output having a voltage level which relates to an amount by which a diaphragm aperture is to be reduced;
(d) detecting means for detecting a charged voltage across the piezoelectric actuator;
(e) means connected to the means for generating the electrical output and to the detecting means and operative to compare said outputs therefrom against each other; and
(f) charging and discharge means connected to the comparing means to charge or discharge the piezoelectric actuator in accordance with the result of its comparison.

17. A diaphragm control apparatus according to claim 16 in which the comparing means is effective to perform a comparing operation at two different levels, a result of a first comparing operation being delivered to the charging means to control it, a result of a second comparing operation being delivered to the discharge means to control it.

18. A diaphragm control apparatus according to claim 16 in which the charging means comprises a first switch connected to the piezoelectric actuator, and a first constant current source connected in series with the first switch element for supplying a constant current to the piezoelectric actuator through the first switch element to accumulate charge thereon, and in which the discharge means comprises a second switch element connected to the piezoelectric actuator, and a second constant current source connected in series with the second switch element to draw a constant current from the piezoelectric actuator through the second switch element, thus discharging it, the first and the second switch element having control terminals connected to the comparing means.

19. A diaphragm control apparatus according to claim 18 in which the comparing means comprises a first and a second voltage divider each operable to divide an output from the detecting means and to deliver two different output voltages $v_1$, $v_1'$ ($v_1 > v_1'$), a first comparator receiving an output from said means for producing the electrical output at its one input and receiving the output voltage $v_1$ at its other input and delivering its decision output which is supplied to the control terminal of the first switch element, and a second comparator receiving an output from said means for generating the electrical output at its one input and receiving the output voltage $v_1'$ at its other input and delivering its output to the control terminal of the second switch element.

20. A diaphragm control apparatus for a camera, comprising
(a) a piezoelectric actuator of bimorph type adapted to produce a bending displacement in response to its charged voltage;
(b) a diaphragm mechanism operatively connected to the piezoelectric actuator to change an aperture in accordance with the displacement of the actuator;
(c) current supply means for supplying a current to the actuator to charge it;
(d) a detector circuit for detecting a charged voltage across the actuator;
(e) means connected to the detector circuit to determine a self-discharge of the actuator when an output from the detector circuit reduces by a given amount; and
(f) control means connected to the detector circuit and the determining means and operative to cease the operation of the current supply means whenever an output from the detector circuit exceeds a given value and to resume the operation of the supply means in response to a signal from the determining means.

21. An apparatus for controlling a photographing aperture to a desired aperture in a camera, comprising:
(a) movable sectors for defining an aperture which is to be used in a photographing operation;
(b) a piezoelectric actuator adapted to produce a displacement in response to an applied voltage thereto;
(c) a voltage application circuit for applying a voltage across the actuator;
(d) a control circuit connected to the voltage application circuit to control the applied voltage in a manner such that the voltage gradually increased from zero in response to a start signal and means for gradually decreasing the voltage in response to the completion of the exposure operation;
(e) means for producing a start signal in response to the operation of a release button of a camera; and
(f) means for acting upon the control circuit when the aperture reaches a given value and delivering a stop signal which ceases a voltage increasing operation by the control circuit.

22. A diaphragm control apparatus for a camera, comprising
(a) voltage-displacement conversion means for producing a displacement which changes in accordance with the level of an applied voltage thereto;
(b) a diaphragm drive mechanism connected to the conversion means and operated by the displacement of the conversion means to define an aperture in accordance therewith;
(c) means for determining a diaphragm aperture value and for delivering corresponding diaphragm controlling information;
(d) means for producing a reset signal in response to a release signal;
(e) reset means responding to the reset signal by applying a given reset voltage to the voltage-displacement conversion means to establish a minimum aperture; and
(f) means for applying a voltage which depends on an output from the diaphragm control value determining means to the voltage-displacement conversion means subsequent to the operation of the reset means.

23. An apparatus for controlling a photographing aperture in a camera, comprising
(a) voltage-displacement conversion means for producing a displacement which changes with the level of an applied voltage thereto;
(b) aperture control means connected to the conversion means and operated by the displacement of the conversion means to define an aperture in accordance therewith;
(c) output producing means for determining an aperture and delivering a corresponding output;
(d) means for producing a reset signal prior to the initiation of an exposure operation by a camera;
(e) reset means responding to the reset signal to apply a given reset signal to the voltage-displacement conversion means for a given time interval and subsequently reducing the applied voltage to zero; and
(f) means for applying a voltage which depends on an output from the output producing means to the voltage-displacement conversion means subsequent to the operation of the reset means.

24. An apparatus according to claim 23 in which the reset voltage includes a first voltage which causes a displacement of the piezoelectric actuator in a direction to reduce an aperture defined by the diaphragm blades through a given amount or greater, and a second voltage which causes a displacement of the piezoelectric actuator which brings the diaphragm blades to their open aperture condition.

25. An apparatus according to claim 23 in which the reset voltage causes a displacement of the piezoelectric actuator in a direction to bring the diaphragm blades to a greater aperture beyond the fully open aperture.

26. An apparatus according to claim 23 in which the reset voltage includes a first voltage which causes a displacement of the piezoelectric actuator in a direction to bring the diaphragm blades to a greater aperture than the fully open aperture, and a second voltage which causes a displacement of the piezoelectric actuator to bring the diaphragm blades to an open aperture condition.

27. An apparatus for controlling a photographing aperture in a camera, comprising
  (a) a piezoelectric actuator of bimorph type;
  (b) movable sectors operatively connected to the actuator to define an aperture;
  (c) detecting means for detecting an initial position of the sectors and delivering a corresponding output; and
  (d) reset means connected to the detecting means for acting upon the piezoelectric actuator to bring the sectors to the initial position in response to a detected signal which indicates that the sectors are not in their initial position.

28. An apparatus according to claim 27 in which the detecting means operates in response to a release signal.

29. Apparatus for controlling a photographing aperture to a desired aperture in a camera, comprising
  (a) movable sectors for defining an aperture which is to be used in a photographing operation;
  (b) a piezoelectric actuator adapted to produce a displacement in response to an applied voltage thereto for moving said movable sectors;
  (c) a voltage application circuit for applying a voltage across said actuator;
  (d) a control circuit connected to the voltage application circuit to control the applied voltage for stepwise increasing the voltage until the aperture becomes the desired aperture, each stepwise increase in voltage reducing at a predetermined ratio relative to each preceding stepwise increase independently of the aperture.

30. A method for controlling the operation of an aperture mechanism by a piezoelectric actuator whose displacement controls the aperture mechanism responsive to an input voltage comprising the steps of:
  applying a gradually increasing voltage to said input responsive to initiation of a shutter release member;
  terminating the increasing voltage signal applied to said input when the voltage signal reaches a predetermined level; and thereafter gradually reducing the voltage level applied to said input until the voltage level reaches a zero level.

31. The method of claim 30 wherein the step of gradually increasing the voltage level further comprises increasing the voltage level at a rate which minimizes the overshooting and hunting of the aperture mechanism.

32. The method of claim 30 wherein the step of gradually decreasing the voltage level further comprises decreasing the voltage level at a rate which minimizes the overshooting and hunting of the aperture mechanism.

33. The method of claim 30 wherein the step of gradually increasing the voltage to the input further comprises the step of increasing the voltage in a stepwise fashion.

34. The method of claim 30 wherein the step of gradually decreasing the voltage to the input further comprises the step of decreasing the voltage in a stepwise fashion.

35. The method of claim 31 wherein each stepwise change is less than the immediately preceding stepwise change.

36. The method of claim 32 wherein each stepwise change is less than the immediately preceding stepwise change.

37. A method for controlling the operation of an aperture mechanism by a piezoelectric actuator whose displacement controls the aperture mechanism responsive to an input voltage, comprising the steps of:
  applying a gradually increasing voltage to said input preparatory to initiation of a shutter release member;
  terminating the increasing voltage signal applied to said input when the voltage signal reaches a predetermined level; and
  increasing the voltage in stepwise fashion to simulate a gradual change occurring in a linear manner.

38. The method of claim 37 wherein each stepwise change in voltage is less than the preceding stepwise change.

39. A method for controlling the operation of an aperture mechanism by a piezoelectric actuator whose displacement controls the aperture mechanism responsive to voltage applied to the input of said actuator, comprising the steps of:
  applying a voltage to said input whose level represents the maximum positive voltage level to be applied to said input preparatory to initiation of a shutter release operation;
  returning the voltage level at said input to a zero voltage level;
  thereafter applying a voltage to said input according to a desired aperture for a photographing operation responsive to a shutter release request.

40. A method for controlling the operation of an aperture mechanism by a piezoelectric actuator whose displacement controls the aperture mechanism responsive to an input voltage comprising the steps of:
  applying a voltage to said input whose level represents the maximum negative voltage level to be applied to said input preparatory to initiation of a shutter release operation;
  returning the voltage level at said input to a zero voltage level; and
  thereafter applying a voltage to said input according to a desired aperture for a photographing operation responsive to a shutter release request.

41. A method for controlling the operation of an aperture mechanism by a piezoelectric actuator whose displacement controls the aperture mechanism responsive to voltage at the input of said actuator, said actuator having a predetermined hysteresis characteristic including a first maximum deflection in a first direction at a first maximum voltage level and a second maximum deflection opposite said first deflection at a second maximum voltage level, comprising the steps of:
  applying a first one of said maximum voltage levels to said input responsive to a initiate request;
  thereafter returning the voltage level at said input to a zero voltage level; and
  gradually increasing the voltage level applied to said input to obtain a desired aperture.

* * * * *

UNITED STATES PATENT AND TRADEMARK OFFICE
CERTIFICATE OF CORRECTION

PATENT NO. : 4,862,207

DATED : August 29, 1989

INVENTOR(S) : Asakura et al.

It is certified that error appears in the above-identified patent and that said Letters Patent is hereby corrected as shown below:

Column 5, line 64, "amount" should be --mount--

Column 9, line 47, after "further" insert --described later--

Column 10, line 48, delete second occurrence of "of"

Column 10, line 55, "voltage V" should be --voltage $v_1$--

Column 12, line 36, "an" should be --a--

Signed and Sealed this

First Day of October, 1991

Attest:

HARRY F. MANBECK, JR.

Attesting Officer

Commissioner of Patents and Trademarks